US008782742B2

(12) United States Patent
Ando et al.

(10) Patent No.: US 8,782,742 B2
(45) Date of Patent: Jul. 15, 2014

(54) COMMUNICATION APPARATUS, AUTHENTICATION APPARATUS, COMMUNICATION METHOD AND AUTHENTICATION METHOD

(75) Inventors: Satoshi Ando, Fukuoka (JP); Kazuhide Sawabe, Fukuoka (JP); Satoshi Arita, Fukuoka (JP)

(73) Assignee: Panasonic Corporation, Osaka (JP)

( * ) Notice: Subject to any disclaimer, the term of this patent is extended or adjusted under 35 U.S.C. 154(b) by 259 days.

(21) Appl. No.: 13/457,040

(22) Filed: Apr. 26, 2012

(65) Prior Publication Data
US 2012/0278855 A1 Nov. 1, 2012

(30) Foreign Application Priority Data

Apr. 28, 2011 (JP) ................... 2011-101095

(51) Int. Cl.
*G06F 7/04* (2006.01)
*G06F 15/16* (2006.01)
*G06F 17/30* (2006.01)
*H04L 29/06* (2006.01)
*G06F 21/00* (2013.01)
*G06F 9/54* (2006.01)
*H04L 12/70* (2013.01)

(52) U.S. Cl.
CPC ............... *G06F 21/00* (2013.01); *G06F 9/542* (2013.01); *H04L 2012/5642* (2013.01)
USPC .............................................. 726/3; 713/153

(58) Field of Classification Search
CPC ..... H04L 49/35; H04L 49/351; H04L 49/352; H04L 12/00; H04L 29/06455; H04L 2012/00; H04L 2012/445; H04L 2012/564; H04L 2012/5642; G06F 21/00
USPC ............................................... 726/3; 713/153
See application file for complete search history.

(56) References Cited

U.S. PATENT DOCUMENTS 8,069,475 B2 11/2011 Dharanikota
8,630,275 B2 * 1/2014 Ji et al. .......................... 370/338

(Continued)

FOREIGN PATENT DOCUMENTS

| CN | 1549547 | 11/2004 |
| JP | 2007-68161 | 3/2007 |

OTHER PUBLICATIONS

NPL "Understanding 802.1X", 2008, https://sites.google.com/site/amitsciscozone/home/switching/802-1x.*
European Search Report dated Jul. 27, 2012.
"Port-Based Networking Access Control," IEEE Standard for Local and metropolitan area networks, IEEE Std 802.1X-2004, XP 17603784A, Dec. 13, 2004, 177 pages total.

*Primary Examiner* — Peter Poltorak
*Assistant Examiner* — Quy Pham
(74) *Attorney, Agent, or Firm* — Seed IP Law Group PLLC

(57) ABSTRACT

A communication apparatus transmits an authentication frame to an authentication apparatus and receives a response frame for response to the authentication frame from the authentication apparatus so that an authentication process is performed for the communication apparatus by the authentication apparatus. In the communication apparatus, a transmitting section transmits an authentication frame to the authentication apparatus using a multicast address as a transmission destination address, and if a reception determining section determines that the response frame is not received from the authentication apparatus, a transmission destination address changing section changes the transmission destination address from the multicast address to a broadcast address, and the transmitting section transmits the authentication frame that has the transmission destination address changed to the broadcast address to the authentication apparatus.

10 Claims, 28 Drawing Sheets

(56) References Cited

U.S. PATENT DOCUMENTS

| | | | |
|---|---|---|---|
| 2005/0177638 A1* | 8/2005 | Oh | 709/227 |
| 2007/0050839 A1 | 3/2007 | Dharanikota | |
| 2007/0101121 A1* | 5/2007 | Henry et al. | 713/151 |

* cited by examiner

Code
  1:Request
  2:Response
  3:Success
  4:Failure

Identifier
  NUMBER FOR MATCHING Request and Response

Length
  EAP PACKET LENGTH

Data
  DATA

COMMUNICATION APPARATUS, AUTHENTICATION APPARATUS, COMMUNICATION METHOD AND AUTHENTICATION METHOD

BACKGROUND

1. Technical Field

The present invention relates to a communication apparatus and an authentication apparatus that are connected through a network, and a communication method and an authentication method in those apparatuses.

2. Background Art

In order to prevent communication apparatuses which are not allowed to be connected in advance from being connected to a LAN (Local Area Network), IEEE (The Institute of Electrical and Electronics Engineers, Inc.) defines the IEEE Std. 802.1X-2004 for authentication of communication apparatuses. A variety of techniques relating to IEEE 802.1X have been disclosed (for example, see JP-A-2007-68161).

IEEE 802.1X defines a communication apparatus which is called a supplicant, an authentication LAN switch which is called an authenticator and an authentication server which is called an authenticator server, and further defines the format of frames which are communicated between the supplicant, the authenticator and the authenticator server, a state transition of each apparatus, and the like. Further, in the definition of IEEE 802.1X, a technique of communication using the multicast address at layer 2 (01-80-C2-00-00-03) is specified. As a middle-sized network configuration, a configuration may be considered in which a plurality of communication apparatuses is connected to a hub and a single authentication LAN switch is connected to the hub. FIG. 27 is a diagram illustrating a network configuration in the related art. This configuration includes two communication apparatuses, one hub, one authentication LAN switch, and one authentication server.

However, if an EAPOL non-forwarding hub which does not forward multicast of EAPOL (EAP over LAN) is used as the hub, authentication based on IEEE 802.1X may not be performed.

(First Problem)

FIG. 25 is a diagram illustrating a sequence in the related art. The flow will be described with reference to FIG. 25. In a case where authentication based on IEEE 802.1X is started, a communication apparatus transmits an EAPOL-Start frame in a multicast mode. An EAPOL non-forwarding hub discards the EAPOL-Start frame without being forwarded since a transmission destination is a multicast address. In a case where an authentication LAN switch starts authentication, the communication apparatus transmits EAP-Identity Request frame in a multicast mode. Since the transmission destination is a multicast address, the EAPOL non-forwarding hub discards the EAP-Identity Request frame without being forwarded. In this way, in a case where the EAPOL non-forwarding hub is present between the communication apparatus and the authentication LAN switch, communication based on IEEE 802.1X may not be performed.

(Second Problem)

Further, a technique in which IEEE 802.1X authentication is performed using a unicast address as a transmission destination address instead of a multicast address is generally known as one of the functions of the authentication LAN switch. However, in a case where IEEE 802.1X authentication in which the communication apparatus uses a multicast address as a transmission destination address is performed, communication may not be performed in a similar way to the first problem. FIG. 26 is a diagram illustrating another example of a sequence in the related art. Description will be made with reference to the flow in FIG. 26. For example, even in a case where an authentication LAN switch transmits EAP-Identity Request to a transmission destination address using unicast, since a communication apparatus uses a multicast address as the transmission destination address, EAP-Identity Response is discarded in an EAPOL non-forwarding hub, so that communication cannot be performed. Further, when the authentication LAN switch uses the unicast address as the transmission destination address, a preparation process of registering a MAC address of the communication apparatus in advance is necessary. Thus, it is necessary to register the MAC addresses corresponding to the number of communication apparatuses, which is undesirable.

(Third Problem)

Referring to FIG. 27, an EAPOL forwarding hub allows multicast forwarding will be described. Since the EAPOL forwarding hub allows multicast forwarding, a frame is forwarded to all apparatuses which are connected to the hub. Thus, a communication apparatus receives an unnecessary frame, and communication of other communication apparatuses is interfered with the forwarded frames.

Description will be made with reference to FIG. 28. For example, since a multicast address is used as a transmission destination address, EAPOL-Start (EAPOL-Start frame) of a communication apparatus (Supp1) reaches an authentication LAN switch and a communication apparatus (Supp2). The communication apparatus (Supp2) discards EAPOL-Start according to the stipulation of IEEE 802.1X. The authentication LAN switch receives EAPOL-Start and then transmits EAP-Identity Request using a unicast address as a transmission destination address. Here, a case where the authentication LAN switch has the function of performing authentication using a unicast address, as mentioned in the second problem, is described. The communication apparatus (Supp1) sends EAP-Identity Response using a multicast address as a transmission destination address in response to EAP-Identity Request. Since the multicast address is used as the transmission destination address, EAP-Identity Response of the communication apparatus (Supp1) reaches the authentication LAN switch and the communication apparatus (Supp2). When received EAP according to the stipulation of IEEE 802.1X, the communication apparatus (Supp2) is subject to a state transition. As a result of the state transition, the communication apparatus (Supp2) succeeds in authentication, but results in authentication being performed twice. In this way, there is a problem that unnecessary authentication is performed as the communication of the communication apparatus (Supp1) interferes with the communication apparatus (Supp2).

As described above, the problems to be solved are that authentication is not performed in a network environment where the EAPOL non-forwarding hub is connected and that the multicast address is used to interfere with other communication apparatuses in a network environment where the EAPOL forwarding hub is connected.

SUMMARY

Some aspects of the invention provide a communication apparatus, an authentication apparatus, a communication method and an authentication method for capable of performing authentication even in a case where a hub which does not forward a multicast address is present in a communication path in a network environment where a plurality of communication apparatuses is connected.

An aspect of the present invention provides a communication apparatus for transmitting an authentication frame to an authentication apparatus and receiving a response frame for response to the authentication frame from the authentication apparatus so that an authentication process is performed for the communication apparatus by the authentication apparatus, the communication apparatus including: a transmission destination address changing section which changes a transmission destination address of the authentication frame; a reception determining section which determines whether the response frame is received from the authentication apparatus; and a transmitting section which transmits the authentication frame to the authentication apparatus, wherein the transmitting section transmits the authentication frame to the authentication apparatus using a multicast address as the transmission destination address, and if the reception determining section determines that the response frame is not received from the authentication apparatus, the transmission destination address changing section changes the transmission destination address from the multicast address to a broadcast address, and the transmitting section transmits the authentication frame that has the transmission destination address changed to the broadcast address to the authentication apparatus.

According to the configuration above, even in a case where the communication apparatus is connected to the authentication apparatus through a hub which does not forward a multicast address, the communication apparatus is able to transmit the authentication frame to the authentication apparatus by changing the transmission destination address from the multicast address to a broadcast address, and the authentication apparatus is able to effectively perform the authentication process by receiving the authentication frame.

DETAILED DESCRIPTION

Figure 1:
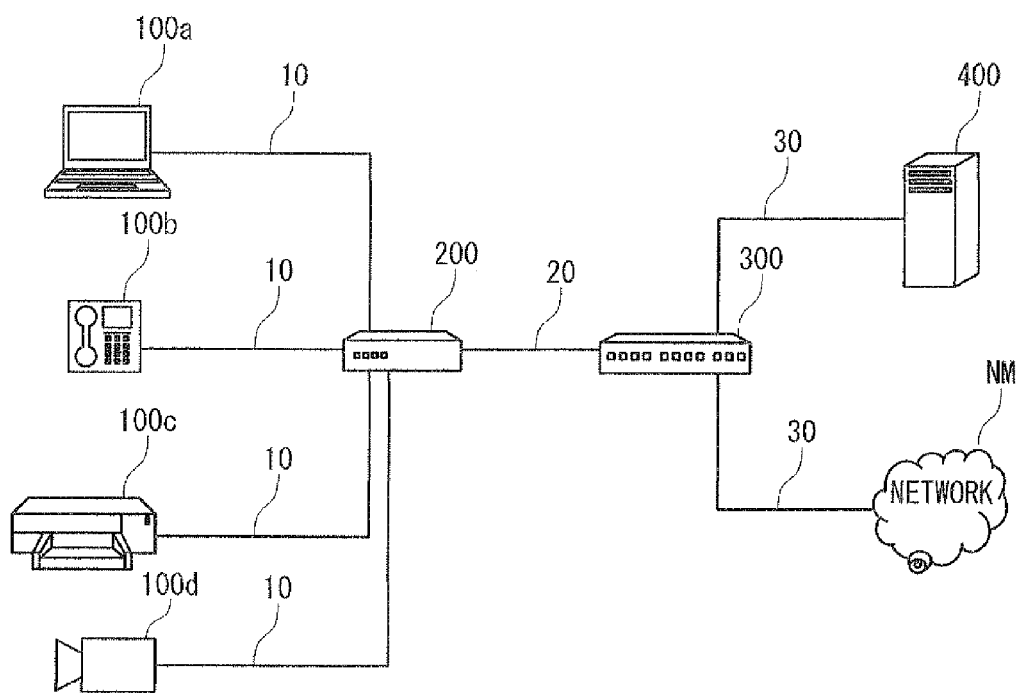
FIG. 1 is a diagram illustrating an overall configuration according to a first embodiment of the invention.

A first aspect of the invention provides a communication apparatus for transmitting an authentication frame to an authentication apparatus and receiving a response frame for response to the authentication frame from the authentication apparatus so that an authentication process is performed for the communication apparatus by the authentication apparatus, the communication apparatus including: a transmission destination address changing section which changes a transmission destination address of the authentication frame; a reception determining section which determines whether the response frame is received from the authentication apparatus; and a transmitting section which transmits the authentication frame to the authentication apparatus, wherein the transmitting section transmits the authentication frame to the authentication apparatus using a multicast address as the transmission destination address, and if the reception determining section determines that the response frame is not received from the authentication apparatus, the transmission destination address changing section changes the transmission destination address from the multicast address to a broadcast address, and the transmitting section transmits the authentication frame that has the transmission destination address changed to the broadcast address to the authentication apparatus.

According to the first aspect of the invention, even in a case where the communication apparatus is connected to the authentication apparatus through a hub which does not forward a multicast address, since the communication apparatus transmits the authentication frame to the authentication apparatus by changing the transmission destination address to the broadcast address, the authentication apparatus can effectively perform the authentication process by receiving the authentication frame.

A second aspect of the invention provides the communication apparatus according to the first aspect, wherein when the response frame is received from the authentication apparatus, the transmitting section transmits an authentication frame for response to the response frame to the authentication apparatus in a unicast address using the transmission destination address of the received response frame.

According to the second aspect of the invention, since the transmission destination address of the authentication frame is transmitted as the unicast address which is not the broadcast address, it is possible to prevent the authentication frame from being transmitted to other communication apparatuses. Thus, it is possible to prevent an unnecessary authentication process from being performed as other communication apparatuses receive the authentication frame, and thus, to suppress interference with other communication apparatuses.

A third aspect of the invention provides the communication apparatus according to the second aspect, further including: an authentication process stopping section which stops the authentication process, wherein when the response frame is received from the authentication apparatus, the authentication process stopping section stops the authentication process, and the transmission destination address changing section transmits the authentication frame for response to the response frame to the authentication apparatus in the unicast address using the transmission destination address of the received response frame.

According to the third aspect of the invention, since the unicast address is used from the time when the authentication process is started, it is possible to reliably prevent the authentication frame from being transmitted to other communication apparatuses. Thus, it is possible to suppress interference with other communication apparatuses.

A fourth aspect of the invention provides the communication apparatus according to any one of the first to third aspects, wherein when a predetermined time elapses from a time when the authentication frame is transmitted, the reception determining section determines that the response frame is not received.

According to the fourth aspect of the invention, since it is determined that the response frame will not be received after a certain degree of time elapses, and thus it is possible to enhance accuracy of the determination process.

A fifth aspect of the invention provides the communication apparatus according to any one of the first to fourth aspects, further including an output section which gives a notification to a user when the response frame is received from the authentication apparatus.

According to the fifth aspect of the invention, the user can recognize through a notification that the response frame is received after a change to the broadcast address.

A sixth aspect of the invention provides the communication apparatus according to any one of the first to fifth aspects, wherein the authentication process is performed for the communication apparatus by the authentication apparatus according to a stipulation of IEEE 802.1X.

According to the sixth aspect of the invention, even in a case where the communication apparatus is connected to the authentication apparatus through a hub which does not forward a multicast address, it is possible to effectively perform the authentication process based on the stipulation of IEEE 802.1X.

A seventh aspect of the invention provides an authentication apparatus for transmitting an authentication frame to a communication apparatus and receiving a response frame for response to the authentication frame from the communication apparatus, thereby performing an authentication process for the communication apparatus, the authentication apparatus including: a transmission destination address changing section which changes a transmission destination address of the authentication frame; a reception determining section which determines whether the response frame is received from the communication apparatus; and a transmitting section which transmits the authentication frame to the communication apparatus, wherein the transmitting section transmits the authentication frame to the communication apparatus using a multicast address as the transmission destination address, and if the reception determining section determines that the response frame is not received from the communication apparatus, the transmission destination address changing section changes the transmission destination address from the multicast address to a broadcast address, and the transmitting section transmits the authentication frame that has the transmission destination address changed to the broadcast address to the communication apparatus.

According to the seventh aspect of the invention, even in a case where the authentication apparatus is connected to the communication apparatus through a hub which does not forward a multicast address, since the authentication apparatus transmits the authentication frame to the communication apparatus by changing the transmission destination address to the broadcast address, the communication apparatus can effectively perform the authentication process by receiving the authentication frame.

An eighth aspect of the invention provides the authentication apparatus according to the seventh aspect, wherein when the response frame is received from the communication apparatus, the transmitting section transmits an authentication frame for response to the response frame to the communication apparatus in a unicast address using the transmission destination address of the received response frame.

According to the eighth aspect of the invention, since the transmission destination address of the authentication frame is transmitted as the unicast address which is not the broadcast address, it is possible to prevent the authentication frame from being transmitted to other communication apparatuses. Thus, it is possible to prevent an unnecessary authentication process from being performed as other communication apparatuses receive the authentication frame, and thus, to suppress interference with other communication apparatuses.

Hereinafter, embodiments of the invention will be described with the accompanying drawings.

First Embodiment

FIG. 1 is a diagram illustrating an overall configuration of an authentication system according to a first embodiment of the invention. In FIG. 1, a network used in the present embodiment is shown. The overall configuration shown in FIG. 1 is common to second to eighth embodiments (which will be described later).

A PC 100a, an IP phone 100b, a printer 100c and a network camera 100d are examples of a communication apparatus to be authenticated. In the present embodiment, the communication apparatus has a supplicant function. In the following description, in a case where it is not necessary to particularly distinguish between the PC 100a, the IP phone 100b, the printer 100c and the network camera 100d, they are simply referred to as a "supplicant 100". The function of the supplicant is not limited to the communication apparatuses shown in FIG. 1, but may be applied to other communication apparatuses.

Here, the supplicant refers to a communication apparatus on a client side or a program on the client side which is used when IEEE (The Institute of Electrical and Electronics Engineers, Inc.) 802.1X authentication is performed.

The PC 100a, the IP phone 100b, the printer 100c and the network camera 100d are respectively connected to a hub 200 through an Ethernet (registered trademark) cable 10.

The hub 200 is a network apparatus which forwards an Ethernet (registered trademark) frame. For example, the hub 200 is a repeater hub or a layer 2 switch, and includes a hub which does not forward EAPOL (EAP over LAN (Local Area Network)) (hereinafter, simply referred to as "non-forwarding EAPOL") and a hub which forwards EAPOL (hereinafter, simply referred to as "forwarding EAPOL"). The hub 200 is connected to an authentication LAN switch (also referred to as "authenticator") 300 through an Ethernet (registered trademark) cable 20.

The authentication LAN switch 300 is an example of an authentication apparatus which relays an authentication process. In the present embodiment, the relay apparatus is a network apparatus which has an authenticator function and is a LAN switch which has an authentication function of IEEE 802.1X. The authenticator refers to an access point corresponding to IEEE 802.1X.

The authentication LAN switch 300 is connected to an authentication server 400 and a network NW through an Ethernet (registered trademark) cable 30. The authentication server 400 is an example of a controller which controls whether a LAN may be used by a client. In the present embodiment, the controller is a network apparatus which has an authentication server function, and is a RADIUS server.

That is, the PC 100a, the IP phone 100h, the printer 100c and the network camera 100d are connected to the authentication LAN switch 300 through the hub 200.

In FIG. 1, an example where the communication apparatuses are connected through an Ethernet (registered trademark) cable is shown, but the present embodiment is not limited thereto. For example, a different wired transmission channel such as a coaxial cable, a power line communication, or a telephone line may be used. Further, the invention is not limited to wired transmission channels, and may employ a wireless transmission channel. For example, a wireless LAN or Bluetooth (registered trademark) which is defined by a standardized technology such as IEEE 802.11 may be used.

In order to perform authentication on whether connection to a network is allowed or not before data communication is performed, IEEE 802.1X provides a specification in which authentication is performed by performing communication of an authentication frame in the supplicant 100 which includes the PC 100a and an authenticator which is the authentication LAN switch 300, and the authentication server which is the authentication server 400. Data on a supplicant in which authentication is allowed can be transmitted to the network through the authenticator. Data on a supplicant in which authentication is not allowed is blocked by the authenticator and is not transmitted to the network.

Figure 2:
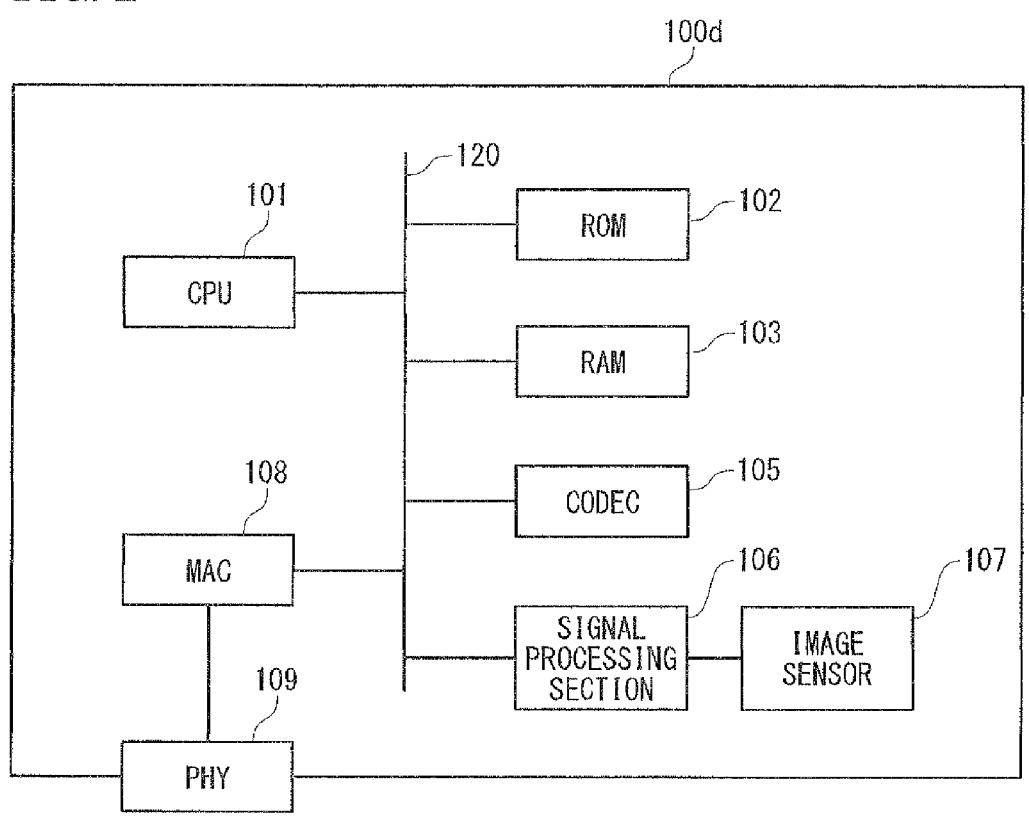
FIG. 2 is a hardware block diagram of a network camera according to the first embodiment of the invention.

FIG. 2 is a diagram illustrating a configuration of hardware of a communication apparatus which has a supplicant function, for example, the network camera 100d. The network camera 100d includes a bus line 120, and further includes a CPU 101, a ROM 102, a RAM 103, a CODEC 105, a signal processing section 106 and a MAC 108 which are connected to the bus line 120. The CPU 101 functions as a central processing unit. The ROM 102 functions as a non-volatile memory which stores a program or the like. The RAM 103 functions as a storage unit for data reading and writing. The CODEC 105 has an image coding function.

The MAC (Media Access Control) 108 functions as a media access control. A PHY (Physical) 109 is connected to the MAC 108, and an image sensor 107 is connected to the signal processing section 106. The PHY 109 functions as a physical layer of the network. The image sensor 107 has a function of converting an image into an electric signal. The signal processing section 106 transmits a signal from the image sensor 107 to the RAM 103 for storage.

In a case where transmission of the authentication frame is performed, such a communication apparatus causes a predetermined program necessary for performing authentication, which is stored in the ROM 102, to be executed by the CPU 101, generates an authentication frame according to an authentication procedure written in the program, and stores the authentication frame in the RAM 103 for transmission. In order to transmit the authentication frame, the MAC 108 performs a process such as CSMA/CD (Carrier Sense Multiple Access/Collision Detection), and forwards the result to a communication medium through the PHY 109. In a case where reception of the authentication frame is performed, the forwarded frame is received through the PHY 109 from the communication medium, and the MAC 108 determines whether the frame is a self-addressed frame and then stores the frame in the RAM 103. The communication apparatus causes the predetermined program necessary for performing authentication stored in the ROM 102 to be executed by the CPU, determines whether the frame stored in the RAM 103 is the authentication frame according to the procedure written in the program, performs analysis if the program is the authentication frame, according to the programmed authentication procedure, and then performs the authentication process.

Figure 3:
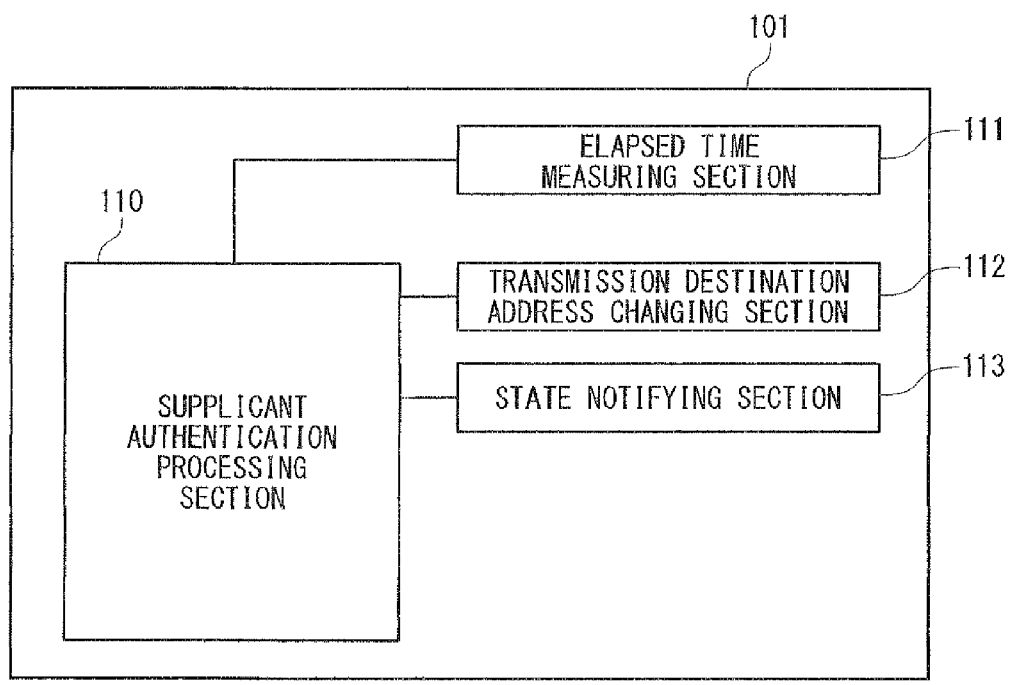
FIG. 3 is a functional block diagram of the network camera according to the first embodiment of the invention.

FIG. 3 is a functional block diagram illustrating the CPU 101a in the supplicant 100 according to the first embodiment. The CPU 101 includes a supplicant authentication processing section 110, an elapsed time measuring section 111, a transmission destination address changing section 112 and a state notifying section 113. Descriptions about processing sections specific to the communication apparatus will be omitted, and thus, they are not shown in FIG. 3. For example, in the network camera, a process of importing an image using the image sensor 107, converting the image into an electric signal, storing the electric signal in the RAM 102 in the signal processing section 106, and compressing the image in the CODEC 105 is a process which is specific to this communication apparatus.

The supplicant authentication processing section 110 performs the authentication process. For example, the supplicant authentication processing section 110 performs a state transition of a supplicant as set forth in IEEE 802.1X to generate and analyze an EAPOL frame, performs a state transition of a supplicant as set forth in RFC 4137 to generate or analyze EAP, or performs an authentication process based on a higher standard.

In order to start authentication by the supplicant authentication processing section 110, the elapsed time measuring section 111 measures time elapsed from the time when EAPOL-Start is transmitted to the time when EAP-Identity Request is received, for example.

The transmission destination address changing section 112 changes a transmission destination address from a multicast address to a broadcast address, after the time measured by the elapsed time measuring section 111 exceeds a predetermined time. The predetermined time is, for example, several tens of seconds, and preferably, is 30 seconds or less. By setting the predetermined time within a retransmission time interval, it is possible to suppress unnecessary retransmission.

The state notifying section 113 changes the transmission destination address from the multicast address to the broadcast address, and then notifies that the authentication frame can be received.

Figure 4:
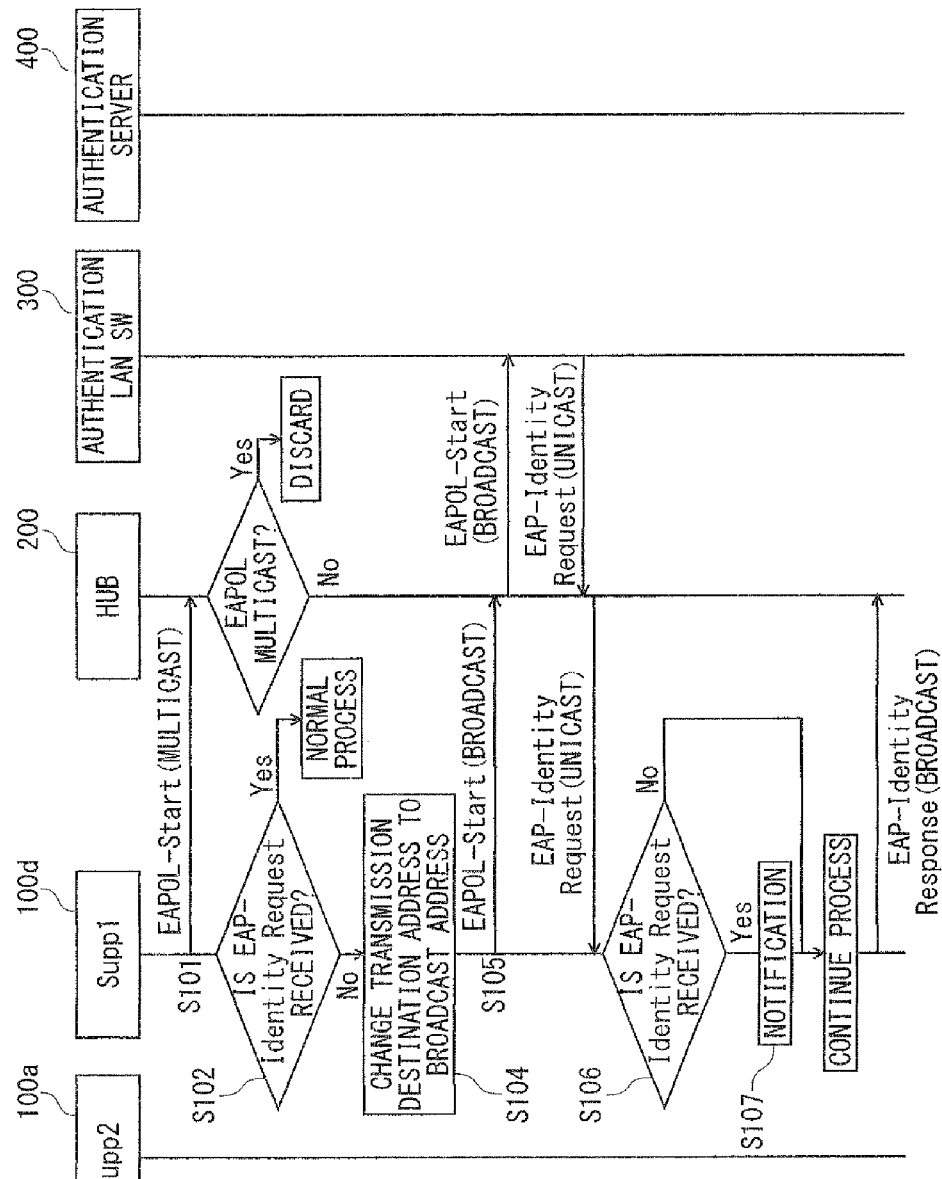
FIG. 4 is a diagram illustrating a sequence according to the first embodiment of the invention.
Figure 5:
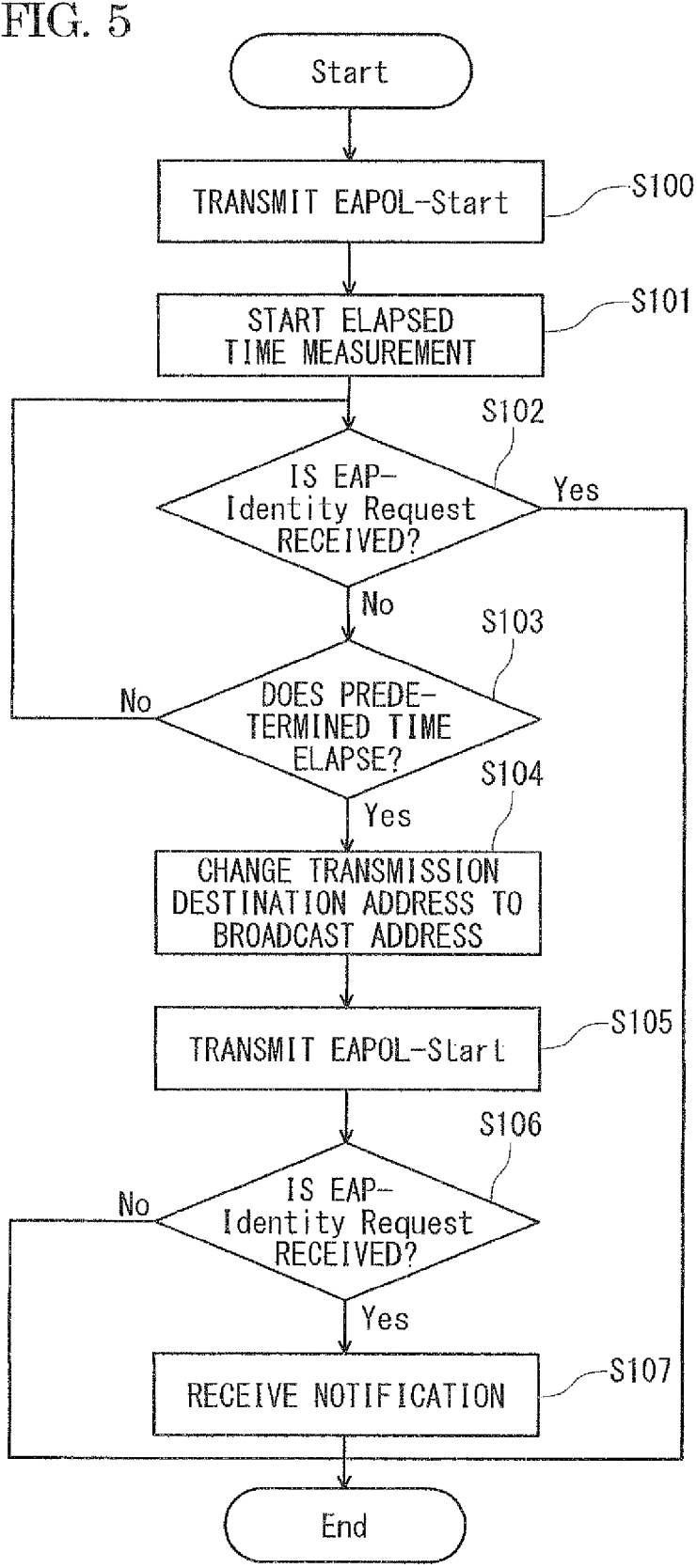
FIG. 5 is a flowchart according to the first embodiment of the invention.

FIG. 4 is a diagram illustrating a sequence according to the first embodiment. FIG. 5 is a flowchart according to the first embodiment. An operation with respect to the first embodiment will be described with reference to FIGS. 3 to 5.

A frame for authentication which is transmitted to the authentication LAN switch 300 by a communication apparatus, which has the supplicant function, which includes the network camera 100d is referred to as an "authentication frame". Accordingly, the authentication frame includes EAPOL-Start or EAP-Identity Response which is transmitted by the communication apparatus which has the supplicant function.

Further, a frame which is transmitted by the authentication LAN switch 300 to the communication apparatus which transmits the authentication frame in response to the authentication frame is referred to as a "response frame". The response frame includes EAP-Identity Request which is transmitted by the authentication LAN switch 300.

In step S100 in FIG. 5, if the authentication process is started in the network camera 100d, the supplicant authentication processing section 110 (see FIG. 3) sets a multicast address as a transmission destination address and then transmits EAPOL-Start. For example, in a case where the power of the communication apparatus is turned on, the supplicant authentication processing section 110 starts up and transmits EAPOL-Start.

In order to start authentication, EAPOL-Start uses a multicast address (01-80-C2-00-00-03) of layer 2 as a transmission destination address. Hereinafter, it is assumed that the expression of the multicast address uses (01-80-C2-00-00-03). The multicast address shows an example of 6 bytes of a hexadecimal number, but is not necessarily limited thereto.

If EAPOL-Start is transmitted in step S100, the network camera 100d waits for reception of EPA-Identity Request in step S101. Specifically, the elapsed time measuring section 111 starts time measurement until EAP-Identity Request is received.

In step S102, the supplicant authentication processing section 110 determines whether EAP-Identity Request is received during a predetermined time. If EAP-Identity Request is received (Yes in S102), the supplicant authentication processing section 110 continues the authentication process and performs reception while complying with the stipulation of the state transition of the supplicant of IEEE 802.1X.

For example, in a case where the hub 200 is an EAPOL forwarding hub, since the hub 200 can receive EAP-Identity Request, the authentication process based on IEEE 802.1X may be continuously performed. For example, EAP-Identity Response is transmitted, and then, the authentication process is continued.

Specifically, if the network camera 100d replies with EAP-Identity Response to the authentication LAN switch 300 through the hub 200, the authentication LAN switch 300 transmits a RADIUS access request to the authentication server 400. Hereinafter, description will be made with reference to a case where MD5 (Message Digest Algorithm 5) is used as an authentication method, for example. If the authentication server 400 replies with a RADIUS access challenge which stores an MD5 challenge to the authentication LAN switch 300, the authentication LAN switch 300 transmits EAP-Request which stores MD5 challenge to the network camera 100d.

The network camera 100d calculates a hash value according to MD5 using a password which is possessed in advance, stores the result in EAP-Response, and then transmits the result to the authentication LAN switch 300 through the hub 200. The authentication LAN switch 300 stores the hash value of MD5 in the RADIUS access request, and then transmits the result to the authentication server 400. The authentication server 400 determines whether the network camera 100d is an allowed terminal on the basis of the received hash value. If the network camera 100d is an allowed terminal, the authentication server 400 transmits a RADIUS access accept to the authentication LAN switch 300. The authentication LAN switch 300 receives the RADIUS access accept, and then transmits EAP-SUCCESS to the network camera 100d.

The authentication LAN switch 300 determines that the network camera 100d is an authenticated terminal by receiving the RADIUS access accept, and thus, can allow communication. Further, the network camera 100d can determine that the authentication is successful by receiving EAP-SUCCESS.

Here, MD5 is used as the authentication method, but the authentication method is not limited to MD5. For example, it is possible to use a variety of authentication methods, such as EAP-TLS (EAP-Transport layer security), PEAP (Protected EAP), LEAP (Lightweight EAP) EAP-TTLS (EAP-Tunneled transport layer security).

In step S102 and step S103, if the network camera 100d does not receive EAP-Identity Request even though the predetermined time elapses (No in S102), in step S104, the transmission destination address changing section 112 changes the transmission destination address to a broadcast address (ff-ff-ff-ff-ff-ff).

For example, in a case where the hub 200 is an EAPOL non-forwarding hub, since the hub 200 cannot forward a frame of a multicast address by discarding the frame, the authentication LAN switch 300 cannot receive EAPOL-Start. As a result, the authentication LAN switch 300 cannot transmit EAP-Identity Request.

In a change to the broadcast address, the transmission destination address is set to the broadcast address. Further, in step S105, the network camera 100d transmits EAPOL-Start in which the transmission destination address is set to the broadcast address.

In step S106, the supplicant authentication processing section 110 determines again whether EAP-Identity Request is received.

If EAP-Identity Request is not received (No in step S106), the supplicant authentication processing section 110 continues the above-mentioned authentication process. If EAP-Identity Request can be received (Yes in step S106), in step S107, the state notifying section 113 notifies a higher application of the fact that reception can be performed through an output section, and then, the supplicant authentication processing section 110 continues the above-mentioned authentication process.

In the higher level application, for example, by flashing an LED of the network camera using an output section such as an LED or a display, it is possible to give a notification to a user. Further, in a case where an indication section such as a display is provided, a message such as "there is a possibility that an EAPOL non-forwarding hub is connected" may be notified to the user.

Since forwarding can be performed even if the hub 200 is an EAPOL non-forwarding hub, the authentication LAN switch 300 can receive EAPOL-Start, and can transmit EAP-Identity Request.

In the present embodiment, an example is shown in which the authentication LAN switch 300 is set to perform the forwarding process using the unicast address as the transmission destination address.

As described above, in the first embodiment, as the network camera 100d changes the transmission destination address from a multicast address to the broadcast address and can receive EAP-Identity Request, for example, it is possible to perform an authentication process based on IEEE 802.1X even in a network environment in which an EAPOL non-forwarding hub is connected, for example.

Further, the user of the supplicant can recognize that the EAPOL non-forwarding hub is connected in a communication path.

The notified content may be that EAP-Identity Request can be received, or may be that the EAPOL non-forwarding hub is connected in the communication path.

In the above-mentioned embodiment, a case where EAPOL-Start is transmitted is shown as an example, but the present embodiment may be applied to any authentication frame, in addition to EAPOL-Start. For example, the present embodiment can be applied to a case where the transmission destination address receives EAP-Identity Request of a unicast address in the communication apparatus from the authentication LAN switch and transmits EAP-Identity Response before EAPOL-Start is transmitted.

Second Embodiment

Figure 6:
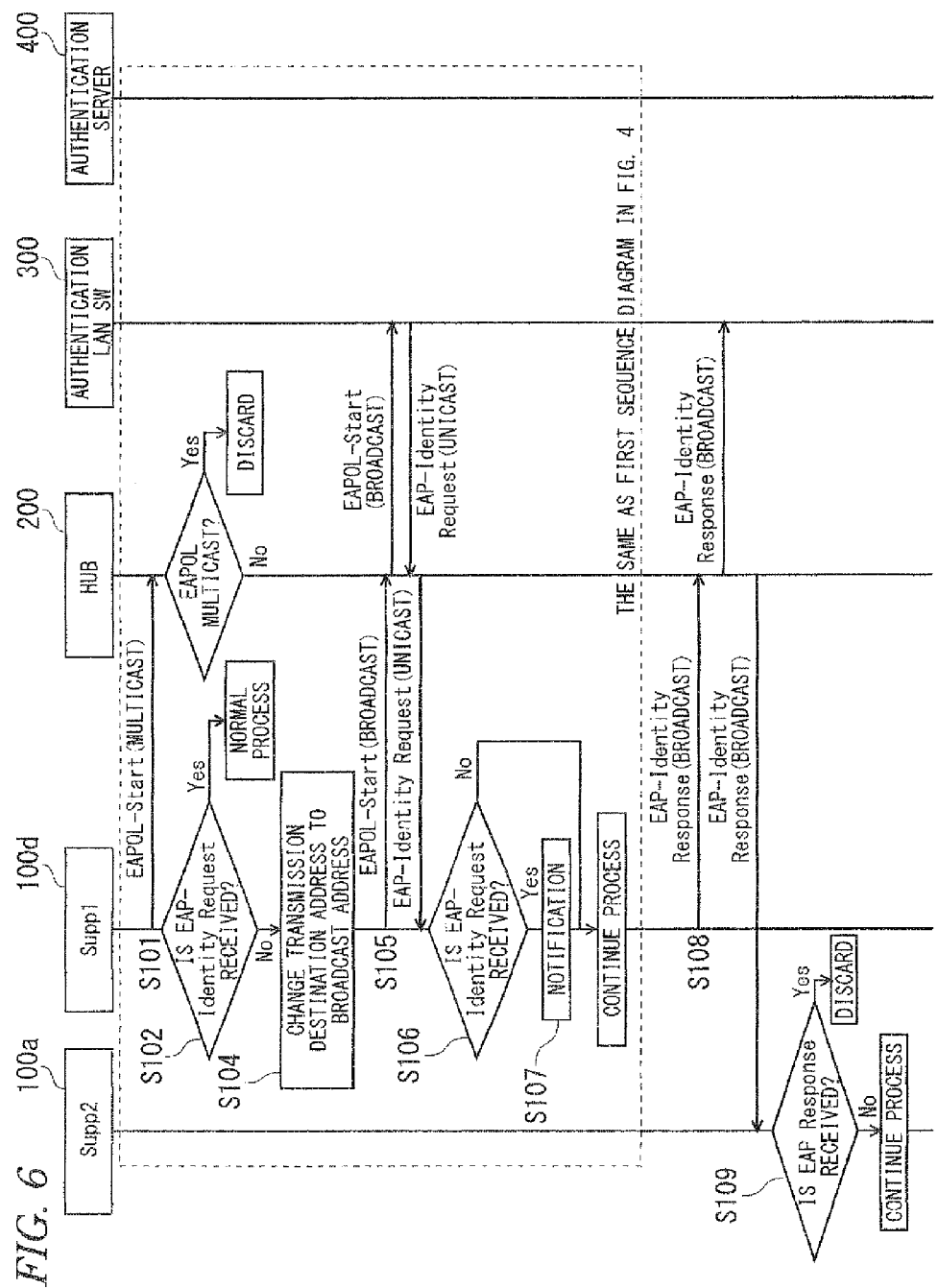
FIG. 6 is a diagram illustrating a sequence according to a second embodiment of the invention.

Next, a second embodiment of the invention will be described with reference to the accompanying drawings. FIG. 6 is a diagram illustrating a sequence according to the second embodiment. The flow by which the network camera 100d starts an authentication process is the same as that in the first embodiment. The same reference numerals are given to the same operations as in FIG. 4. A different point from the first embodiment is in that a process of the PC 100a, that is, step S109 is added.

In step S108, if the network camera 100d transmits an authentication frame, for example, EAP-Identity Response using the broadcast address to a transmission destination for the authentication process, the PC 100a receives EAP-Identity Response through the hub 200.

The supplicant authentication processing section 110 determines whether the received frame is any one of EAP-Response and EAP-Request. If it is determined that the received frame is EAP-Response, the supplicant authentication processing section 110 discards the received frame.

If it is determined that the received frame is EAP-Request, the supplicant authentication processing section 110 receives the frame as an authentication frame transmitted to the communication apparatus, and then performs the authentication process as described in the first embodiment.

Hereinafter, a section of determining whether the received frame is EAP-Request will be described.

Figure 7:
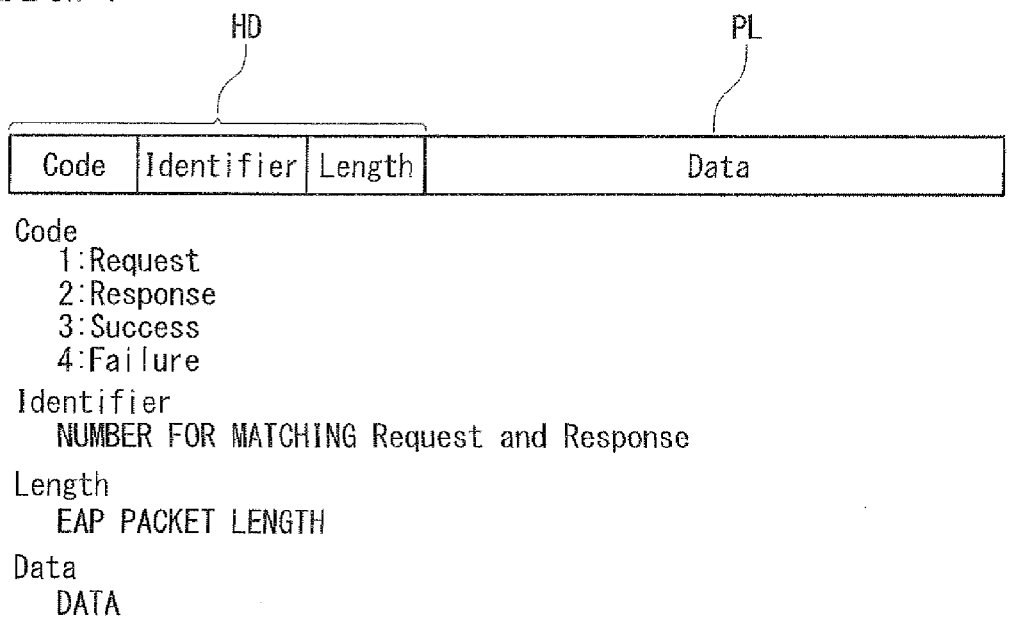
FIG. 7 is a diagram illustrating a configuration of an EAP packet.

FIG. 7 is a diagram illustrating a configuration of EAP. EAP has a header HD and a payload PL. Fields of Code, Identifier and Length are defined in the header HD, and data based on the Code field is stored in the payload PL.

By confirming the Code field (1 byte) among these fields, it is possible to determine whether the received frame is Response. Specifically, Code 1 represents Request, Code 2 represents Response, Code 3 represents Success, and Code 4 represents Failure. In a case where Code has a value of 2, the supplicant authentication processing section 110 discards the received frame as EAP-Response, and then performs the authentication process.

In this way, by discarding EAP-Response, the supplicant authentication processing section 110 can perform the authentication process without performing an unnecessary state transition.

Figure 8:
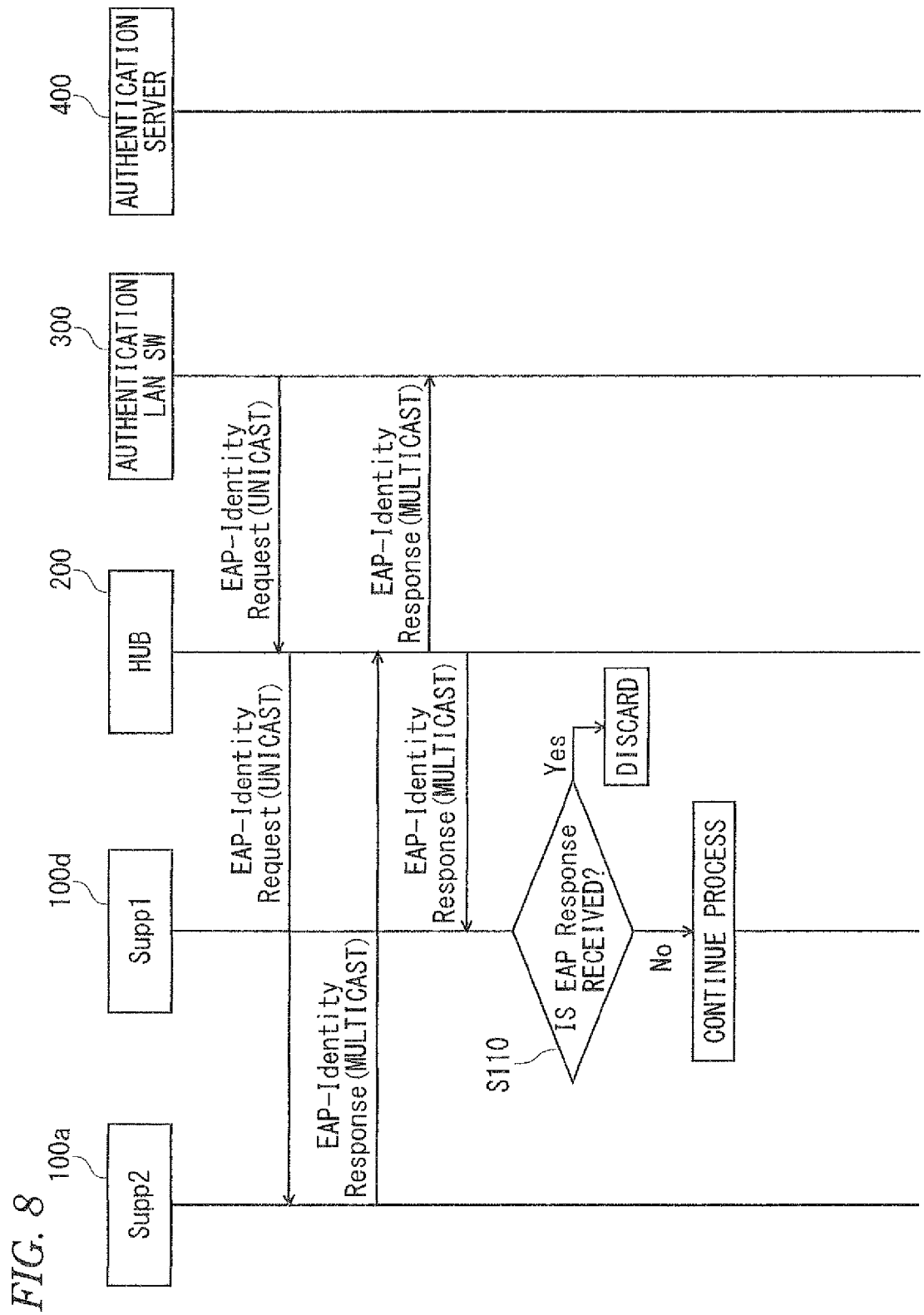
FIG. 8 is a flowchart according to the second embodiment of the invention.

Next, FIG. 8 is a diagram illustrating a sequence of another example of the second embodiment. In a case where the hub 200 is an EAPOL forwarding hub, if the PC 100a transmits an authentication frame using a multicast address as a transmission destination address, the network camera 100d receives the frame. In step S110, if the received frame is EAP-Response, the supplicant authentication processing section 110 discards EAP-Response. In this case, determination of whether the received frame is EAP-Response is performed in a similar way to the above-described method.

By employing the above-described method, even in a case where an authentication frame of another communication apparatus is received, it is possible to perform the authentication process without interference.

In the above-mentioned embodiment, EAP-Response is discarded by the supplicant authentication processing section 110, but the present embodiment is not limited thereto. For example, if determination can be performed in a process of a lower layer such as an Ethernet (registered trademark) driver, EAP-Response may be discarded by the determining layer.

Third Embodiment

Hereinafter, a third embodiment of the invention will be described with reference to the accompanying drawings.

Figure 9:
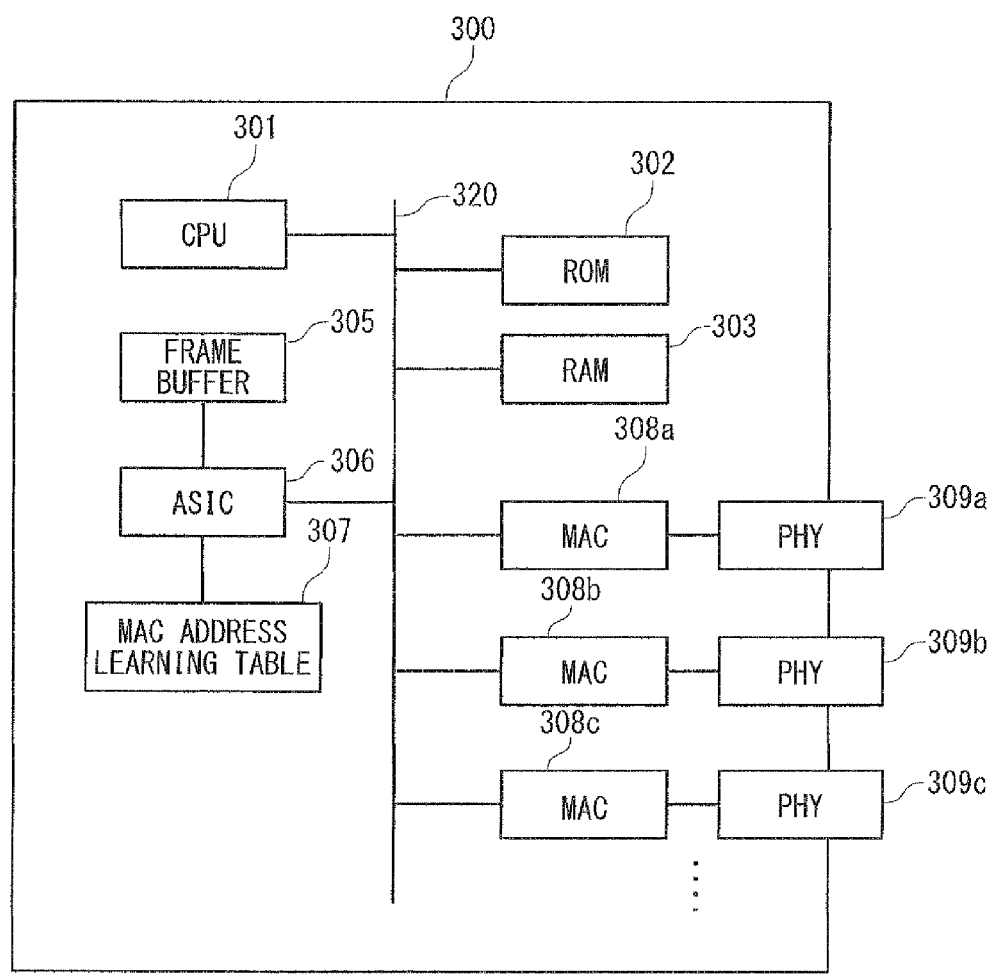
FIG. 9 is a hardware block diagram illustrating an authentication LAN switch according to a third embodiment of the invention.

FIG. 9 is a diagram illustrating a hardware configuration of an authentication LAN switch 300. The authentication LAN switch 300 is an authentication apparatus which has an authenticator function. The authentication LAN switch 300 includes a CPU 301, a ROM 302, a RAM 303, MACs 308a, 308b, 308c . . . , PHYs 309a, 309b, 309c . . . , a frame buffer 305, an ASIC (Application Specific Integrated Circuit) 306, and a MAC address learning table 307, and these elements are connected through a bus line 320. The CPU 301 functions as a central processing unit. The ROM 302 functions as a non-volatile memory which stores a program or the like; the RAM 303 functions as a storage unit for data reading and writing; the MACs function as a plurality of media access controls; the PHYs function as a plurality of physical layers of the network; the MAC address learning table has a function of learning a transmission source address of a received frame and has a function of firstly storing a frame which is received in the frame buffer; and the ASIC has a function of performing communication management for each port.

Next, an operation will be described. A forwarded frame is received from a communication medium through the PHYs 309a, 309b, 309c . . . , is framed in the MAC 308a, 308b, 308c . . . , is stored in the frame buffer 305, and is subject to an error check. A predetermined program stored in the ROM 302 is executed by the CPU 301, and then, an authentication process is performed for the received frame according to an authentication procedure written in the program. In, forwarding, a transmission source address is stored in the MAC address learning table 307, which is used for determining a physical forwarding destination by the ASIC 306. In frame forwarding, a process such as CSMA/CD is performed by the MACs 308a, 308b, 308c . . . , which is forwarded to the communication medium through the PHYs 309a, 309b, 309c . . . .

Figure 10:
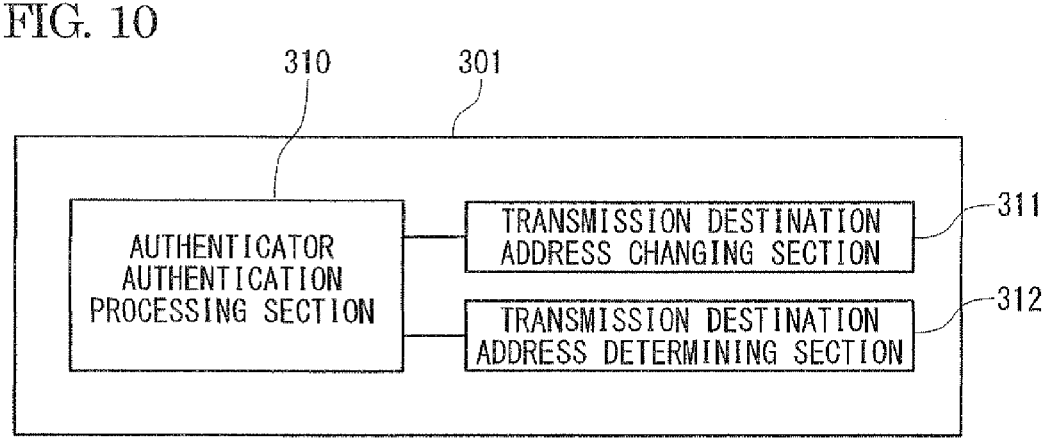
FIG. 10 is a functional block diagram illustrating a CPU of the authentication LAN switch according to the third embodiment of the invention.

FIG. 10 is a diagram illustrating a configuration of a CPU in an authentication LAN switch. Here, processing sections which are specific to a LAN switch are not particularly mentioned, and are thus not shown. The CPU 301 includes an authenticator authentication processing section 310, a transmission destination address changing section 311 and a transmission destination address determining section 312.

The authenticator authentication processing section 310 performs an authentication process. For example, the authenticator authentication processing section 310 performs a state transition of an authenticator disclosed in IEEE 802.1X, to generate and analyze an EAPOL frame or performs a state transition of an authenticator disclosed in RFC 4137, to generate and analyze EAP, and performs a process of a higher EAP method or the like.

The transmission destination address determining section 312 determines whether a transmission destination address of the received authentication frame is a broadcast address. In a case where the transmission destination address of the received authentication frame is the broadcast address as a result of the determination of the transmission destination address determining section 312, the transmission destination address changing section 311 changes the transmission destination address to a unicast address using a transmission source address of the received authentication frame.

Figure 11:
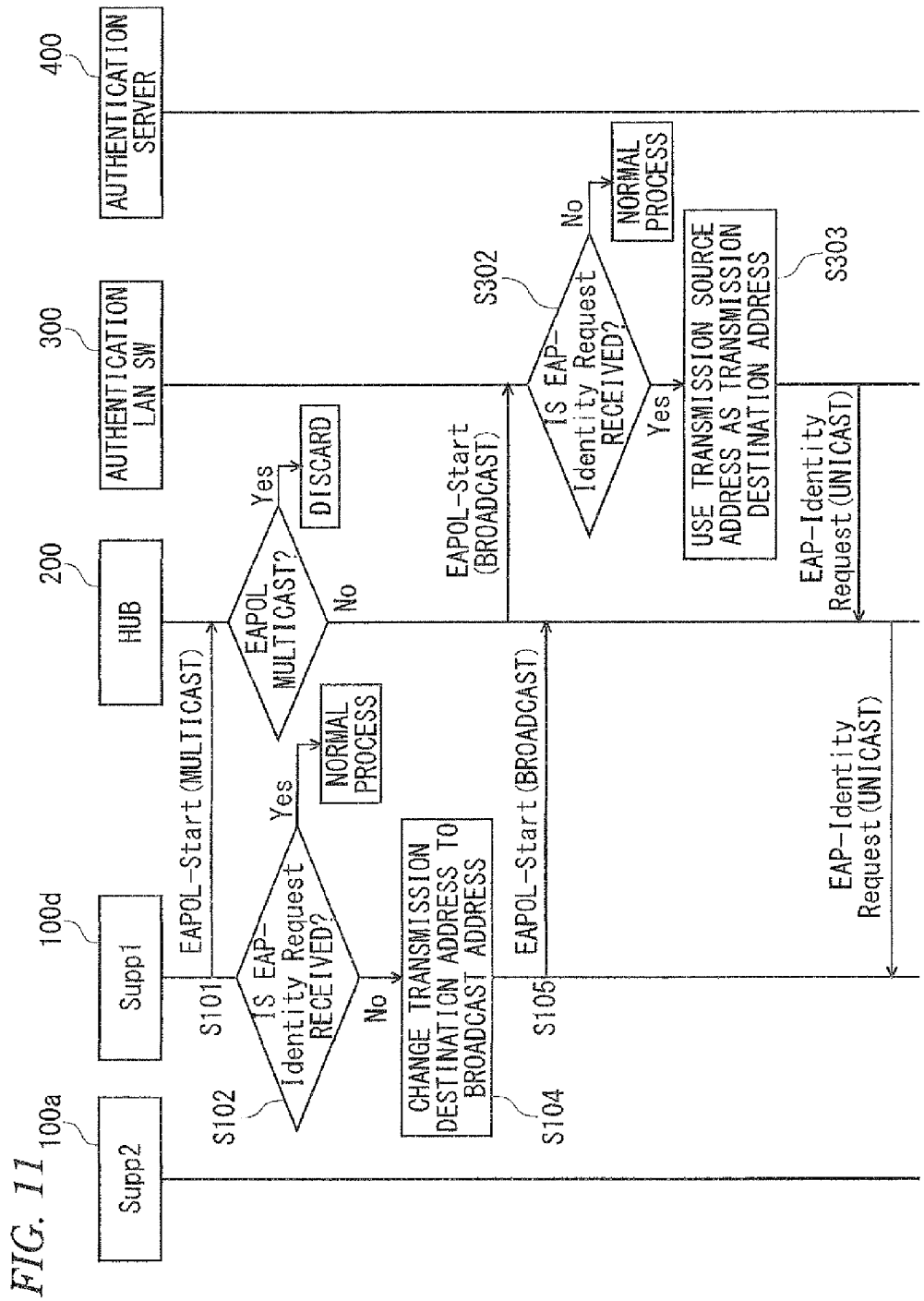
FIG. 11 is a diagram illustrating a sequence according to the third embodiment of the invention.
Figure 12:
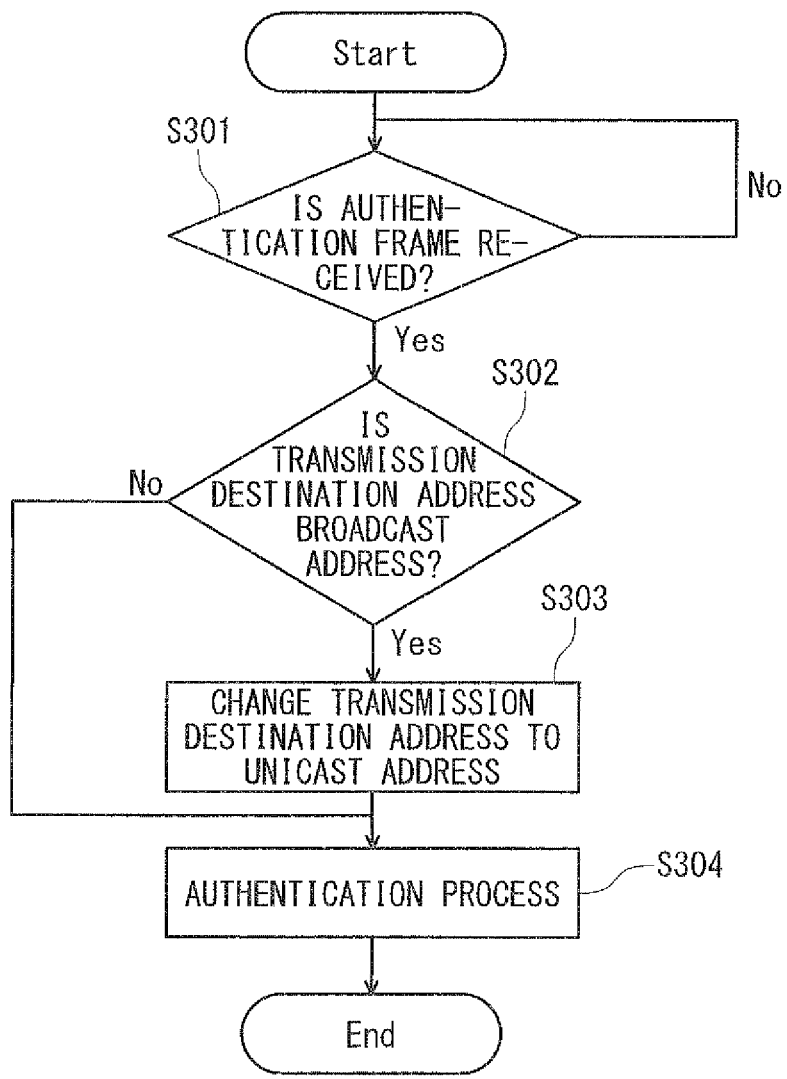
FIG. 12 is a flowchart according to the third embodiment of the invention.

FIG. 11 is a diagram illustrating a sequence according to the third embodiment. FIG. 12 is a flowchart according to the third embodiment of the invention. Step S101 to S105 in FIG. 11 are the same as those in FIG. 4.

In step S105, the network camera 100d performs the same operation as in the first embodiment, and transmits EAPOL-Start using the broadcast address as the transmission destination address.

In step S301, the authenticator authentication processing section 310 starts the authentication process, and the authentication LAN switch 300 determines whether the authentication frame is received.

If the authentication frame is received, the authentication LAN switch 300 determines that the authentication frame is received (Yes in S301), and in step S302, the transmission destination address determining section 312 confirms whether the transmission destination address is the broadcast address. For example, this corresponds to a case where the transmission destination receives EAPOL-Start of the broadcast address. If the transmission destination address is not the broadcast address (No in S302), the authentication process is continued. For example, the authentication process is continued according to the state transition of the authenticator in IEEE 802.1X. If the transmission destination address is the broadcast address (Yes in S302), in step S303, transmission is performed using the transmission source address of the received EAPOL-Start as the transmission destination address of the authentication frame to be transmitted.

Specifically, the transmission destination address changing section 311 changes the transmission destination address to the EAPOL-Start transmission source address that received the transmission destination address, and performs the authentication process in step S304. For example, the transmission destination uses the transmission source address of EAPOL-Start of the broadcast address as the transmission destination address of the authentication frame, and performs the authentication process based on the state transition of the authenticator in IEEE 802.1X.

As described above, in the above-mentioned third embodiment, even in a network environment where an EAPOL non-forwarding hub is connected, it is possible to perform the authentication process of IEEE 802.1X. Further, since the transmission can be performed as the unicast address, it is possible to perform the authentication process without interference with other communication apparatuses.

Fourth Embodiment

Hereinafter, a fourth embodiment of the invention will be described with reference to the accompanying drawings. In the fourth embodiment, an operation in an authentication LAN switch will be described.

Figure 13:
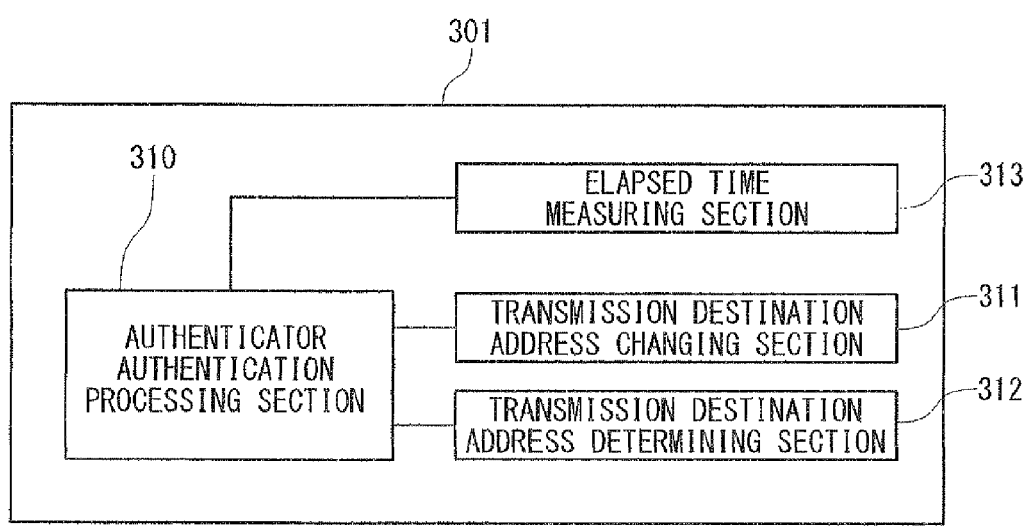
FIG. 13 is a hardware block diagram illustrating an authentication LAN switch according to a fourth embodiment of the invention.

FIG. 13 is a diagram illustrating a configuration of an authentication LAN switch according to the present embodiment. Here, processing sections which are specific to a LAN switch are not particularly mentioned, and are thus not shown. Since an authenticator authentication processing section, a transmission destination address changing section and a transmission destination address determining section are the same as those in FIG. 10, the same reference numerals am given thereto, and description thereof will be omitted. The CPU 301 is different from that in FIG. 10, and includes an elapsed time measuring section 313.

The elapsed time measuring section 313 measures time from the time when the authenticator authentication processing section 310 transmits EAP-Identity Request to the time when the authenticator authentication processing section 310 receives EAP-Identity Response. After the time measured in the elapsed time measuring process exceeds a predetermined time, the transmission destination address changing section 311 changes a transmission destination address from a multicast address to a broadcast address.

Figure 14:
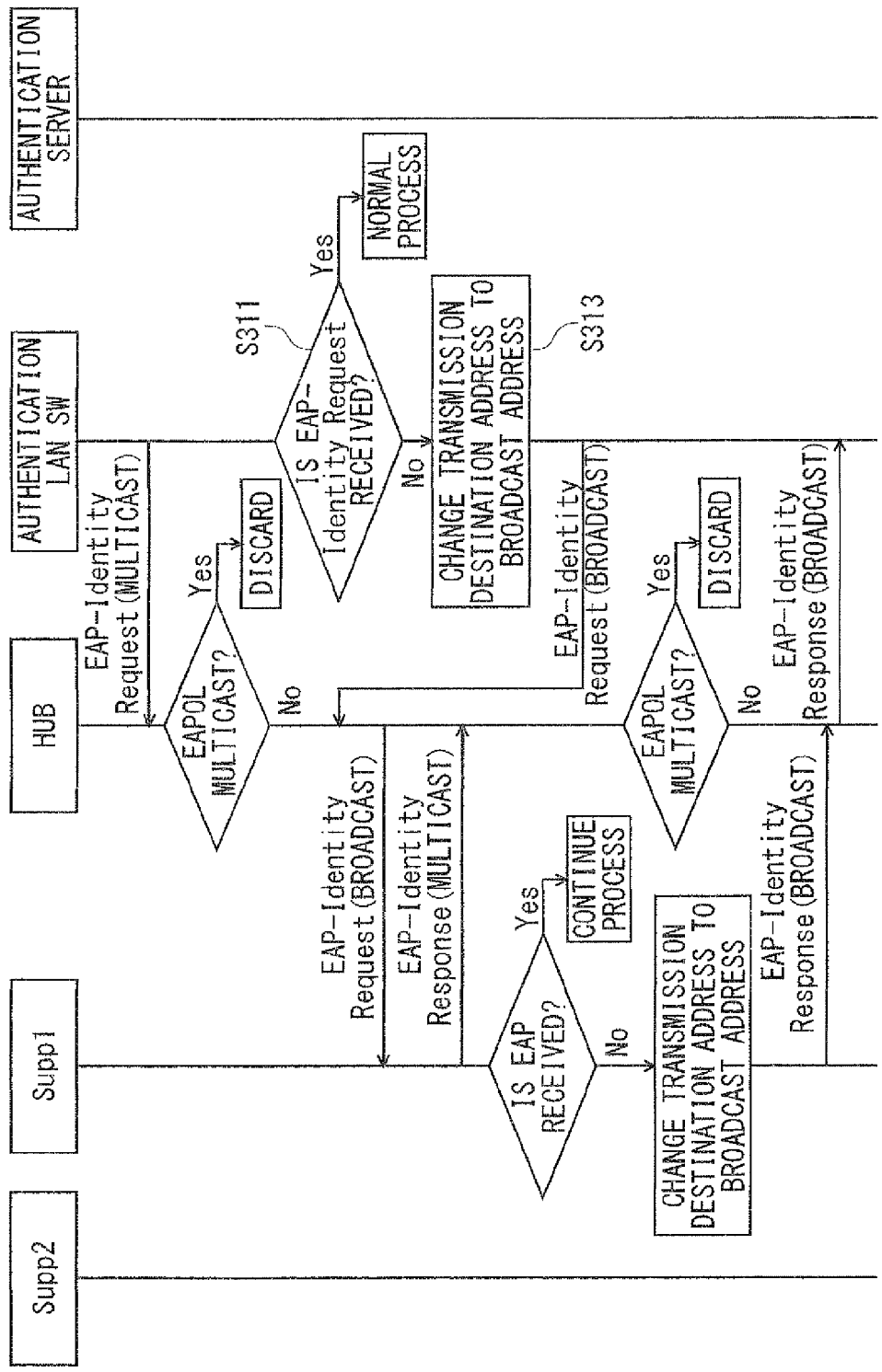
FIG. 14 is a diagram illustrating a sequence according to the fourth embodiment of the invention.
Figure 15:
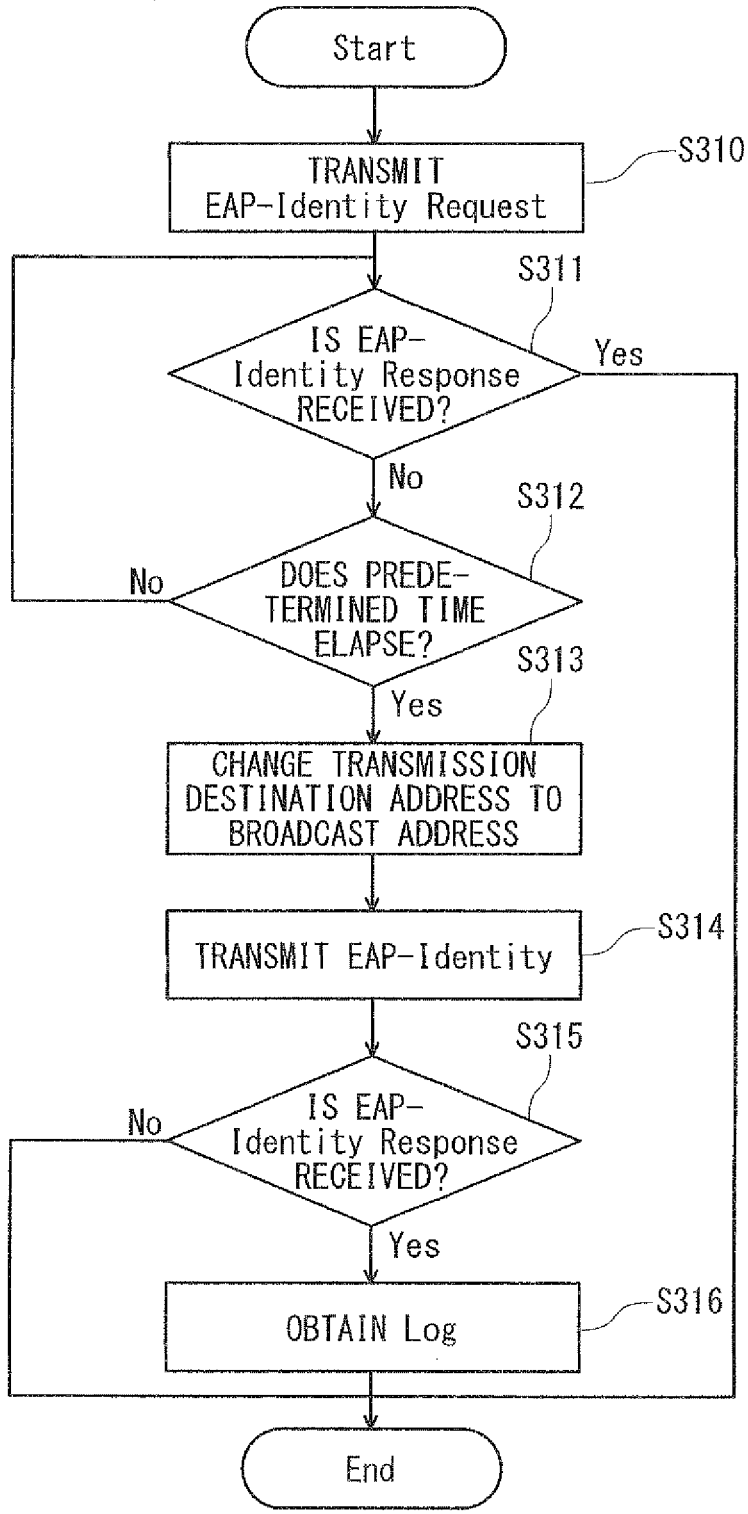
FIG. 15 is a flowchart according to the fourth embodiment of the invention.

The flow of the fourth embodiment will be described with reference to FIGS. 14 and 15. In step S310, the authentication LAN switch 300 transmits EAP-Identity Request using the multicast address as the transmission destination address in order to start authentication. For example, in a case where the power of the authentication LAN switch is turned on, the authenticator authenticating section 310 is operated to transmit EAP-Identity Request.

In step S311, the authentication LAN switch 300 waits for reception of EAP-Identity Response. If the EAP-identity response can be received in a predetermined time (Yes in S311), the authenticator authenticating section 310 continues the authentication process. For example, the authenticator authenticating section 310 performs transmission and reception of the authentication frame while following the state transition of the authenticator of IEEE 802.1X. In a case where the hub 200 is an EAPOL forwarding hub, the authenticator authenticating section 310 can receive EAP-Identity Response, and performs the authentication process based on IEEE 802.1X.

In a case where the hub 200 is an EAPOL non-forwarding hub, the frame of the multicast address cannot be forwarded by discarding the frame, and the network camera 100d cannot receive EAP-Identity Request. As a result, the network camera 100d cannot transmit EAP-Identity Response. The elapsed time measuring section 313 measures time taken until EAP-identity Response is received, and in step S312, the authenticator authenticating section 310 of the authentication LAN switch 300 determines whether the predetermined time elapses.

If EAP-Identity Response cannot be received even though the predetermined time elapses (Yes in S312), in step S313, the transmission address changing section 311 changes the transmission address to the broadcast address. That is, in a case where EAP-Identity Response cannot be received, the transmission destination address is set to the broadcast address (ff-ff-ff-ff-ff-ff). In step S314, the authenticator authenticating section 310 transmits EAP-Identity Request in which the transmission destination address is changed to the broadcast address.

Even though the hub 200 is an EAPOL non-forwarding hub, since forwarding of the frame using the broadcast address can be performed, the network camera 100d can receive the EAP-Identity.

The network camera 100d transmits EAP-Identity Response using the method of the first embodiment. In step S315, the authentication LAN switch 300 determines whether EAP-Identity Response is received. If EAP-Identity Response cannot be received (No in step S315), the authenticator authenticating section 310 continues the authentication process. For example, authenticator authenticating section 310 continues the process based on the state transition of the authenticator of IEEE 802.1X. In a case where the authentication LAN switch 300 changes the transmission destination address from the multicast address to the broadcast address and then receives EAP-Identity Response (Yes in S315), in step S316, the authentication LAN switch 300 retains the content as a data log. As a result, a manager of the authentication LAN switch 300 can advantageously identify that the EAPOL non-forwarding hub is connected in the communication path. With respect to the content of the log, description will be omitted.

As described above, in the above-mentioned fourth embodiment, even in a network environment where the EAPOL non-forwarding hub is connected, it is possible to perform the authentication process of IEEE 802.1X.

Fifth Embodiment

Next, a fifth embodiment of the present invention will be described with reference to the accompanying drawings.

Figure 16:
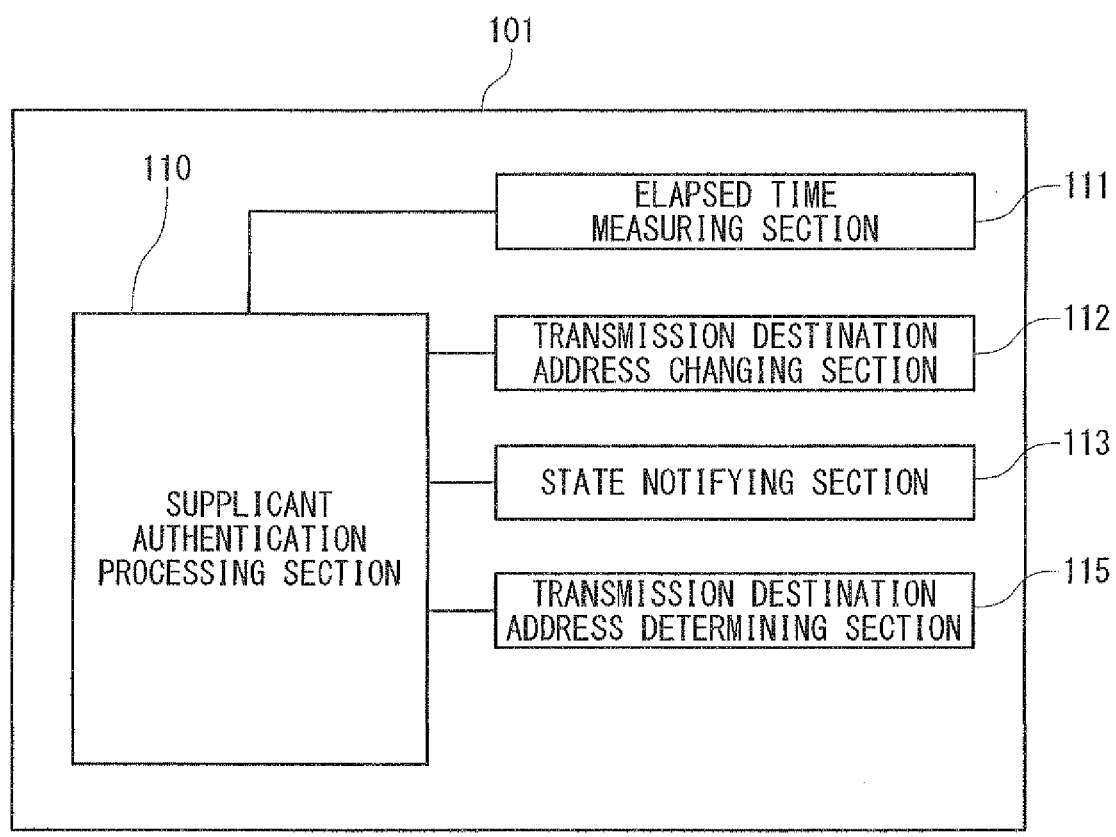
FIG. 16 is a functional block diagram illustrating a CPU of an authentication LAN switch according to a fifth embodiment of the invention.

FIG. 16 is a functional block diagram illustrating the CPU 101 of the network camera 100d according to the present embodiment. In FIG. 16, the same reference numerals are given to the same elements as in FIG. 3. The transmission destination address determining section 112 determines whether a transmission source address of a received authentication frame is a broadcast address. As a result of the determination in the transmission destination address determining section 112, in a case where the transmission source address of the received authentication frame is the broadcast address, the transmission destination address is changed into a unicast address using the transmission source address of the authentication frame received by the transmission destination address changing section 112.

Figure 17:
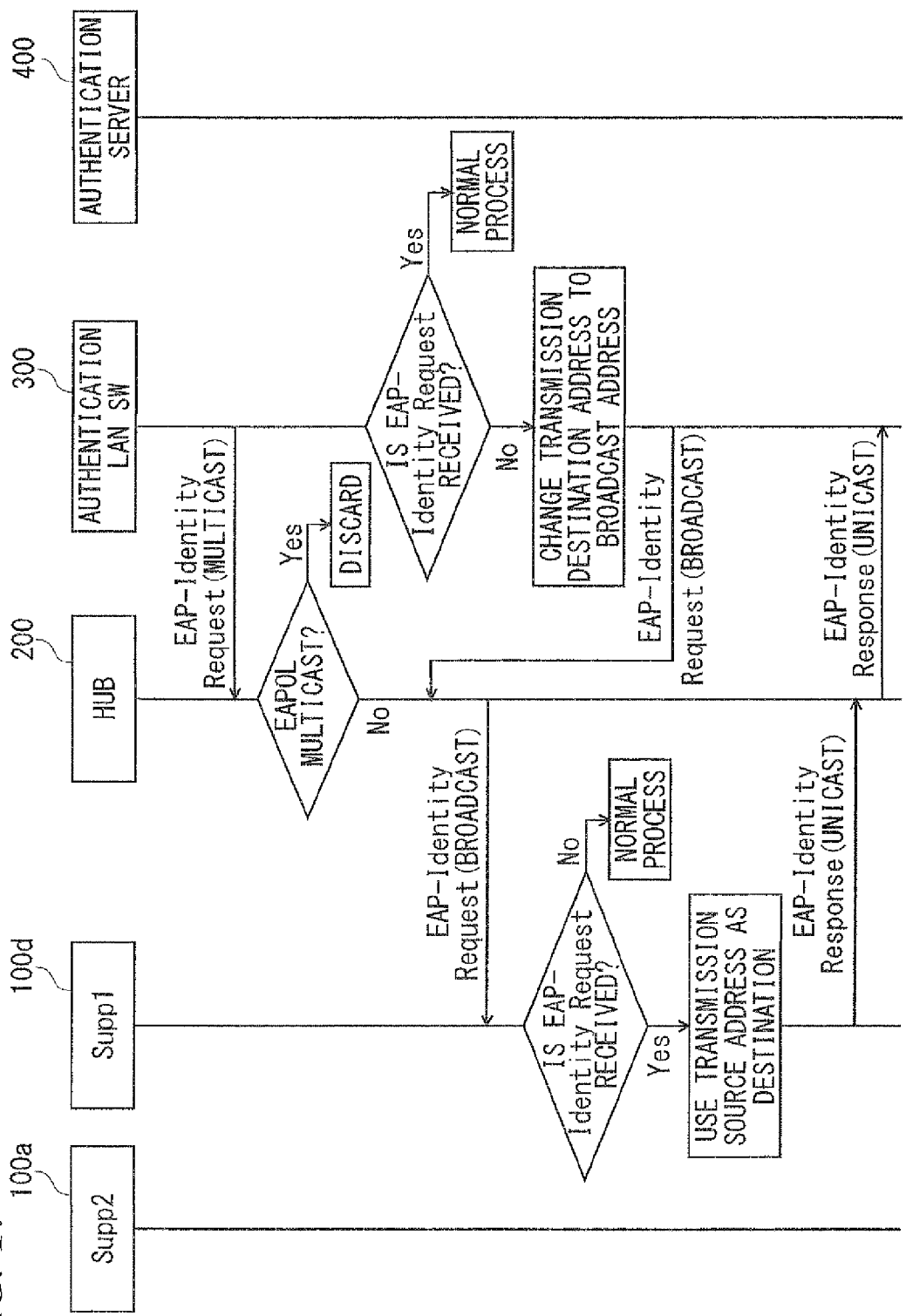
FIG. 17 is a diagram illustrating a sequence according to the fifth embodiment of the invention.

The flow according to the fifth embodiment will be described with reference to FIG. 17. The authentication LAN switch 300 performs the same process as in the fourth embodiment, and transmits EAP-Identity Request using the broadcast address as the transmission destination address. The network camera 100d determines whether the transmission destination address is the broadcast address. If the transmission destination address is the broadcast address, the network camera 100d transmits the authentication frame using the transmission source address of the received EAP-Identity Request as the transmission destination address of the authentication frame to be transmitted.

The flow of the process in the network camera 100d is the same as the flow of the process in the authentication LAN switch 300, and is the same as steps S302 and S303 in FIG. 11. The authentication process may be performed based on the network camera 100d.

As described above, in the above-mentioned fifth embodiment, even in a network environment where the EAPOL non-forwarding hub is connected, it is possible to perform the authentication process of IEEE 802.1X. Further, since transmission in the unicast address can be performed, it is possible to perform the authentication process without interference with other communication apparatuses.

Sixth Embodiment

Figure 18:
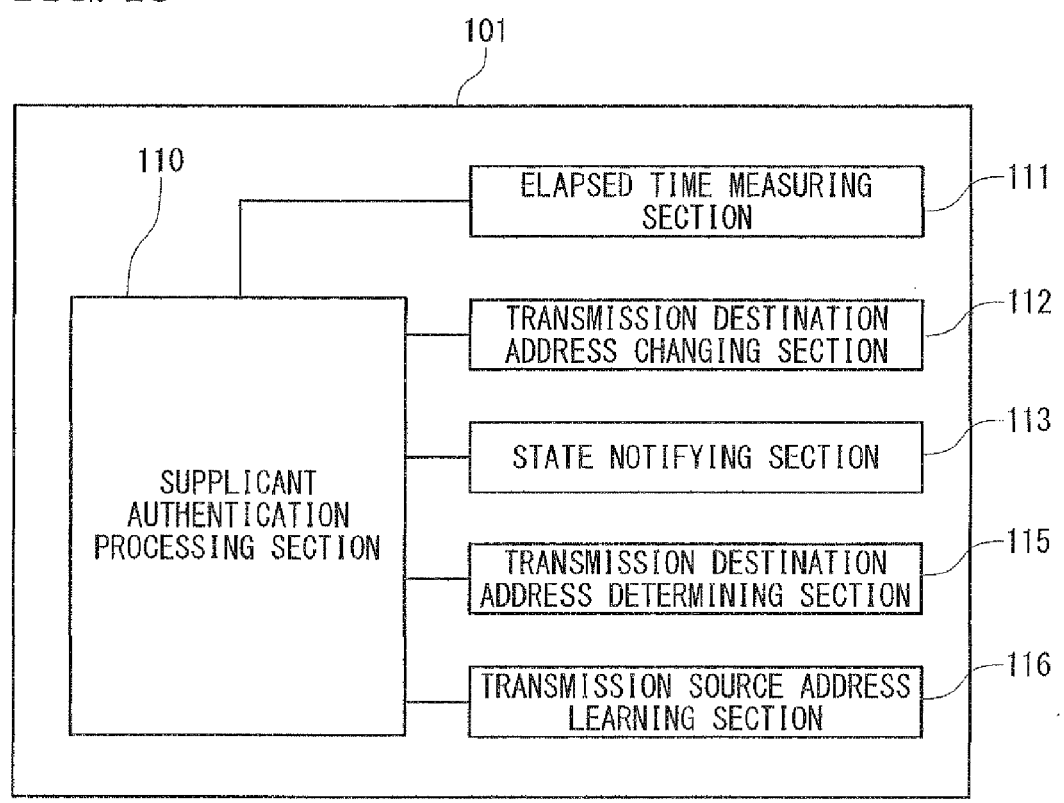
FIG. 18 is a functional block diagram illustrating a CPU of an authentication LAN switch according to a sixth embodiment of the invention.

Next, a sixth embodiment will be described with reference to the accompanying drawings. FIG. 18 is a functional block diagram illustrating a communication apparatus according to the present embodiment. The supplicant authentication processing section 110, the elapsed time measuring section 111, the state notifying section 113 and the transmission destination address changing section 112 are the same as those in the fifth embodiment. A transmission source address learning section 116 learns a transmission source address of a received authentication frame.

If the supplicant authentication processing section 110 receives EAP-Identity Request, the supplicant authentication processing section 110 transmits an authentication frame for terminating the authentication process once, and starts the authentication process again using the address learned by the transmission source address learning section.

Figure 19:
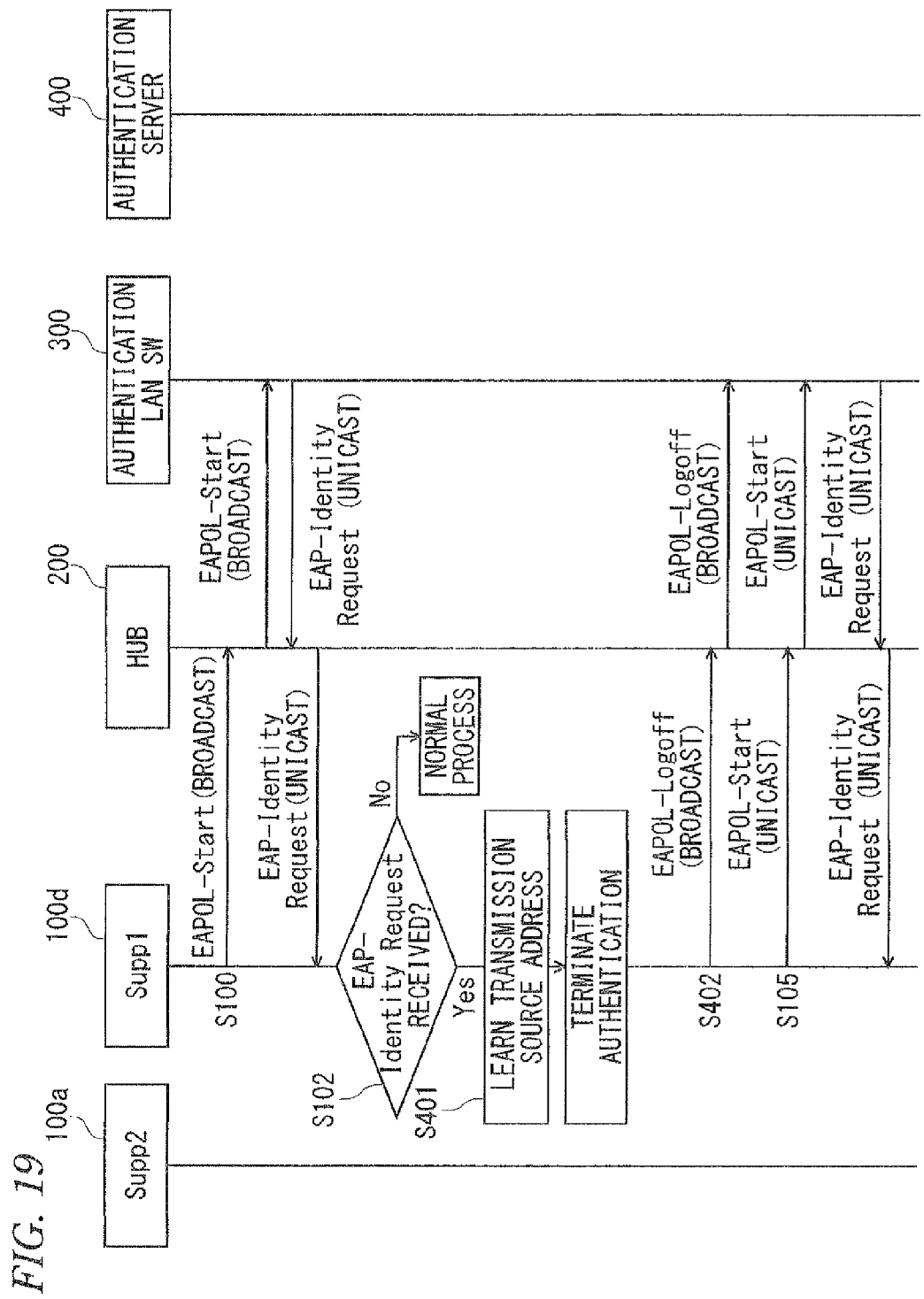
FIG. 19 is a diagram illustrating a sequence according to the sixth embodiment of the invention.

The flow of the sixth embodiment will be described with reference to FIG. 19. The network camera 100d performs the same process as in the first embodiment and transmits EAPOL-Start using a broadcast address as a transmission destination address, and the authentication LAN switch 300 performs the same operation as in the third embodiment and transmits EAP-Identity Request using the broadcast address as the transmission destination address. If the network camera 100d can receive EAP-Identity Request, the network camera 100d learns the transmission source address of the received EAP-Identity Request. After the transmission source address is obtained, EAPOL-Logoff is transmitted to terminate the authentication process once. Further, the authentication is performed again using the learned transmission source address as the transmission, destination address.

Figure 20:
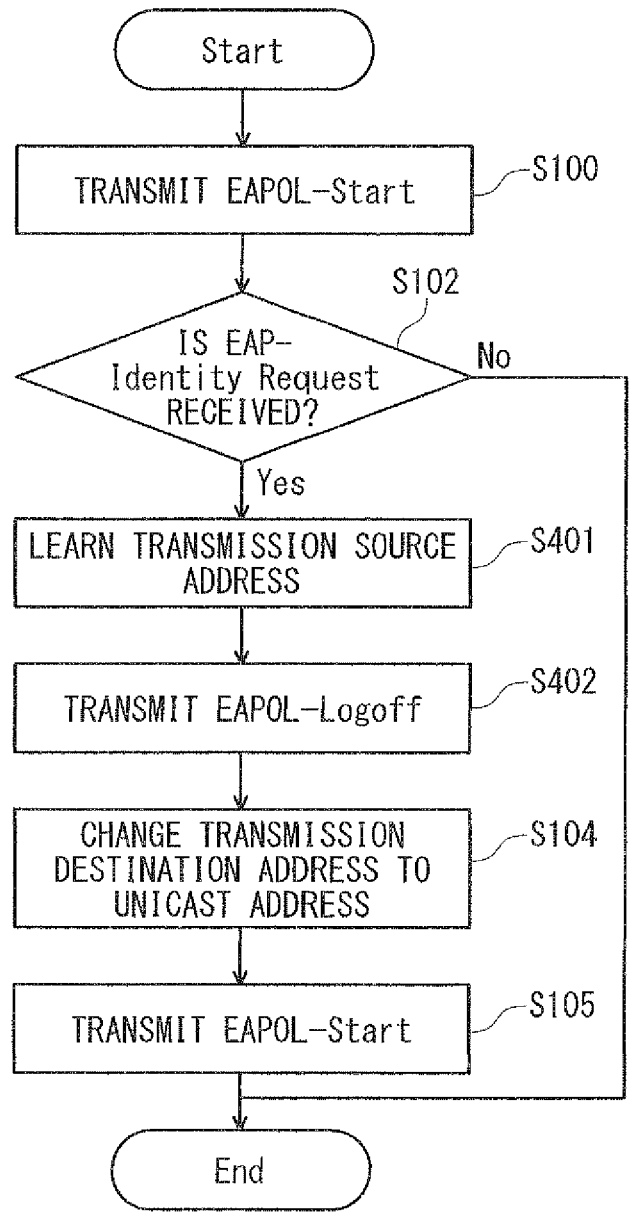
FIG. 20 is a flowchart according to the sixth embodiment of the invention.

Next, the flow of the process in the communication apparatus will be described with reference to FIG. 20. If the authentication process is started, EAPOL-Start is transmitted in step S100, according to the same flow as S100, S102, S104 and S105 in FIG. 5. In step S401, if EAP-Identity Request is received, the transmission source address is learned by the transmission source address learning section. In step S402, in order to terminate the authentication process once, the supplicant authentication processing section 110 transmits EAPOL-Logoff. The authentication process is started in the supplicant authentication processing section 110 using the address learned by the transmission source address learning section 116 as the transmission destination.

As described above, in the above-mentioned sixth embodiment, by using the unicast address as the transmission destination address, it is possible to prevent interference with other communication apparatuses. Further, even in a case where the hub 200 is the EAPOL forwarding hub, it is possible to effectively prevent interference.

Seventh Embodiment

Figure 21:
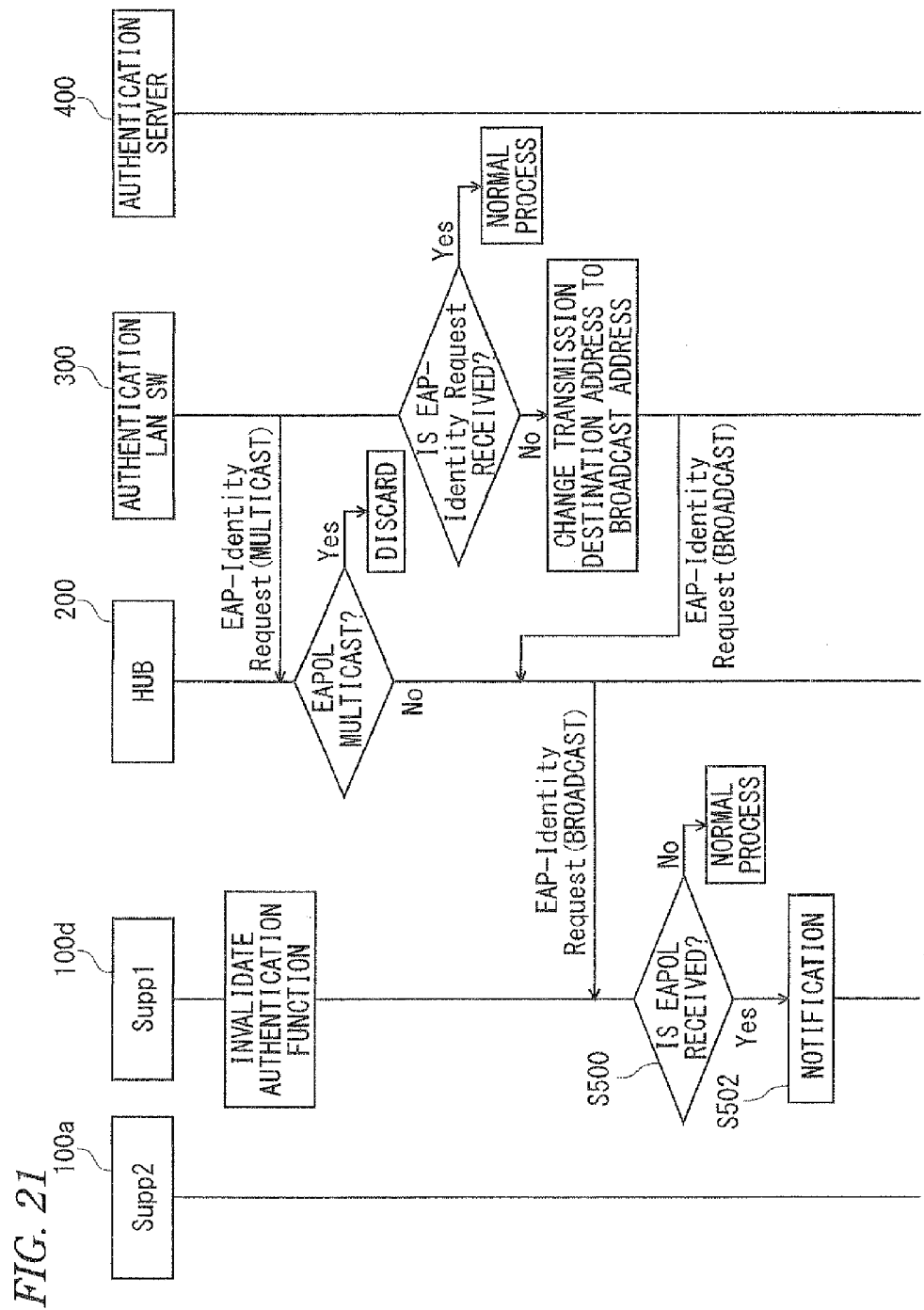
FIG. 21 is a diagram illustrating a sequence according to a seventh embodiment of the invention.

Next, a seventh embodiment will be described with reference to the accompanying drawings. The flow of the seventh embodiment will be described with reference to FIG. 21. The network camera 100d is configured to invalidate the authentication function. For example, the function which validates/invalidates the authentication function is a function capable of determining whether to perform IEEE 802.1X authentication according to an instruction of a user of a communication apparatus. Here, a method of validating/invalidating the authentication function is not limiting.

In a case where the network camera 100*d* receives an authentication frame in a state where the authentication function is invalidated, the network camera 100*d* notifies the user that the authentication function is invalidated.

Figure 22:
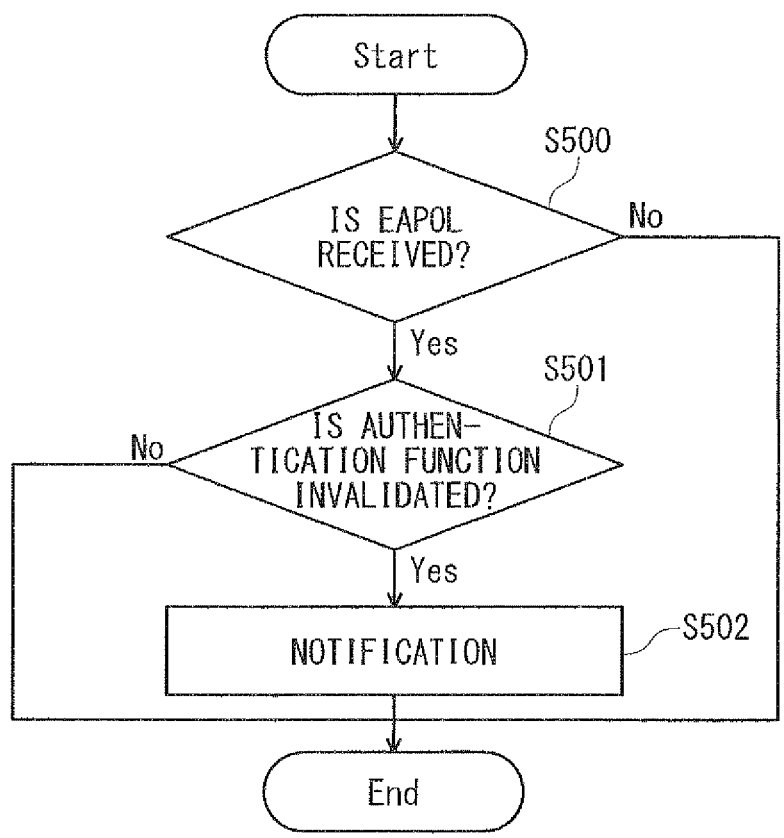
FIG. 22 is a flowchart according to the seventh embodiment of the invention.

Next, the flow of the process of the communication apparatus will be described with reference to FIG. 22. In step S500, if the authentication frame is received (Yes in S500), in step S501, it is determined whether the authentication function is validated or invalidated.

The determination of whether the authentication function is validated or invalidated may be confirmed by determining whether an EtherType field of a frame of Ethernet (registered trademark) is "88-8e". Further, the determination of whether the authentication function is validated or invalidated may be determined by confirming a specific address which is stored in a RAM of the communication apparatus. In a case where the authentication function is invalidated (Yes in S501), in step S502, this is notified to the user. Further, in a case where the authentication function is validated (No in S501), the authentication process may be performed.

As a method of notification to the user, a variety of methods may be used. For example, a light emitting section such as an LED may be turned on or turned off. Further, the notification may be given to the user as a message using a display section such as a display.

As described above, in the above-mentioned seventh embodiment, even though the authentication function is invalidated, it is possible to determine that the communication apparatus is connected to a network environment where IEEE 802.1X authentication is necessary, and the user can determine that the authentication function should be validated.

Eighth Embodiment

Figure 23:
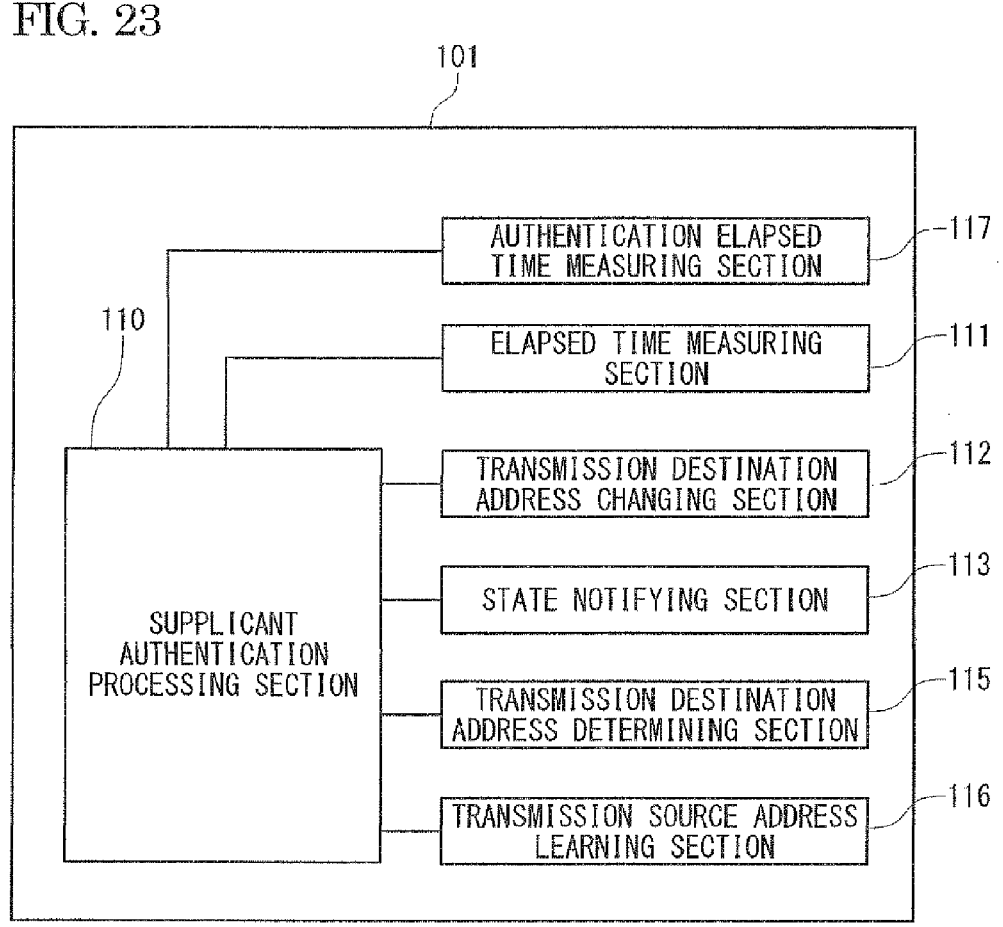
FIG. 23 is a functional block diagram illustrating a CPU of an authentication LAN switch according to an eighth embodiment of the invention.

Next, an eighth embodiment will be described. FIG. 23 is a functional block diagram illustrating a communication apparatus according to the present embodiment. The supplicant authentication processing section 110, the state notifying section 113, the transmission destination address determining section 115, the transmission source address learning section 116 and the elapsed time measuring section 111 are the same as those in the sixth embodiment. An authentication elapsed time measuring section 117 initiates authentication and measures time taken until authentication is finished. For example, the authentication elapsed time measuring section 117 measures time from the time when EAPOL-Start is transmitted to the time when EAP-SUCCESS or EAP-FAILURE is received.

If the supplicant authentication processing section 110 cannot receive an authentication frame from which the authentication result can be determined, for example, EAP-SUCCESS or EAP-FAILURE even though the time measured by the authentication elapsed time measuring section 117 exceeds a predetermined time, the supplicant authentication processing section 110 notifies authentication failure to a higher application as the authentication result. The authentication result may be any one of authentication success and authentication failure.

An authentication frame from which the authentication result can be determined has been described using EAP-SUCCESS or EAP_FAILURE in the present embodiment, but the present embodiment is not limited thereto. For example, in a case where PEAP is used as an authentication method, it may be determined that the authentication is finished when EAPextension SUCCESS or EAPextension FAILURE is received. Alternatively, it may be determined whether the authentication is finished by determining whether it is authenticated according to the state transition of IEEE 802.1X.

Figure 24:
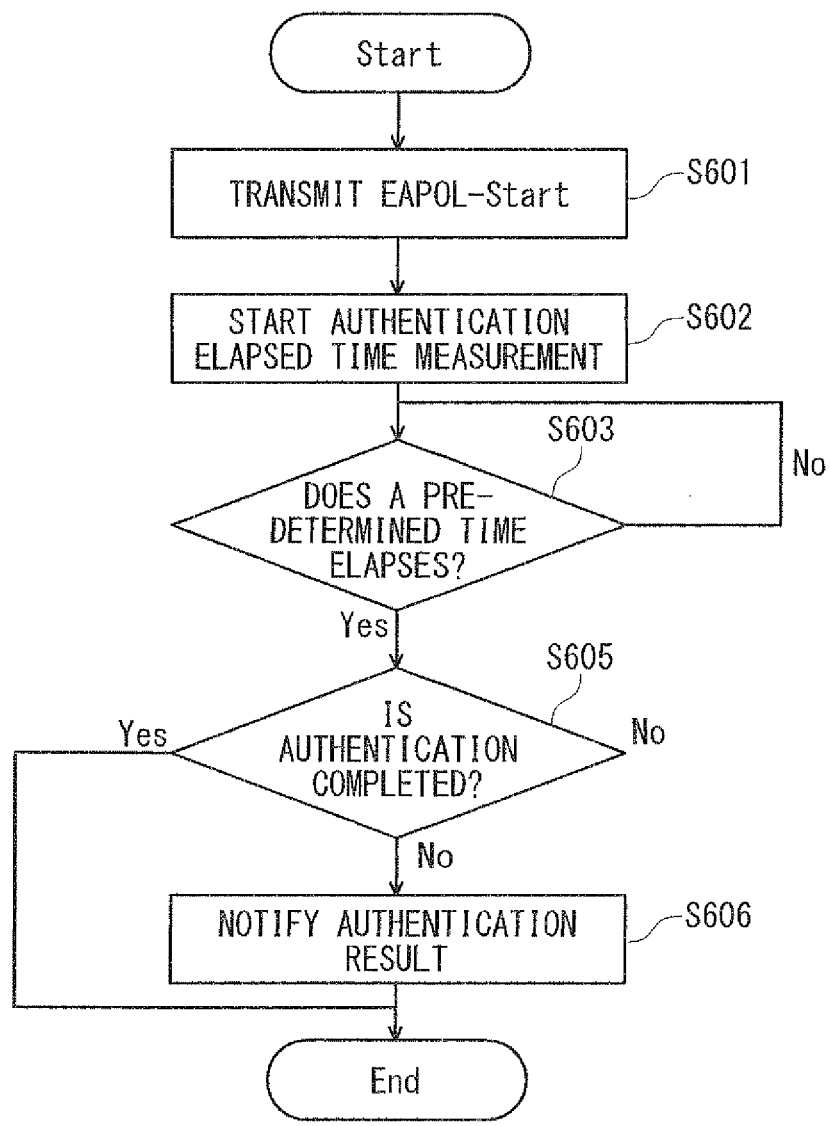
FIG. 24 is a flowchart according to the eighth embodiment of the invention.
Figure 25:
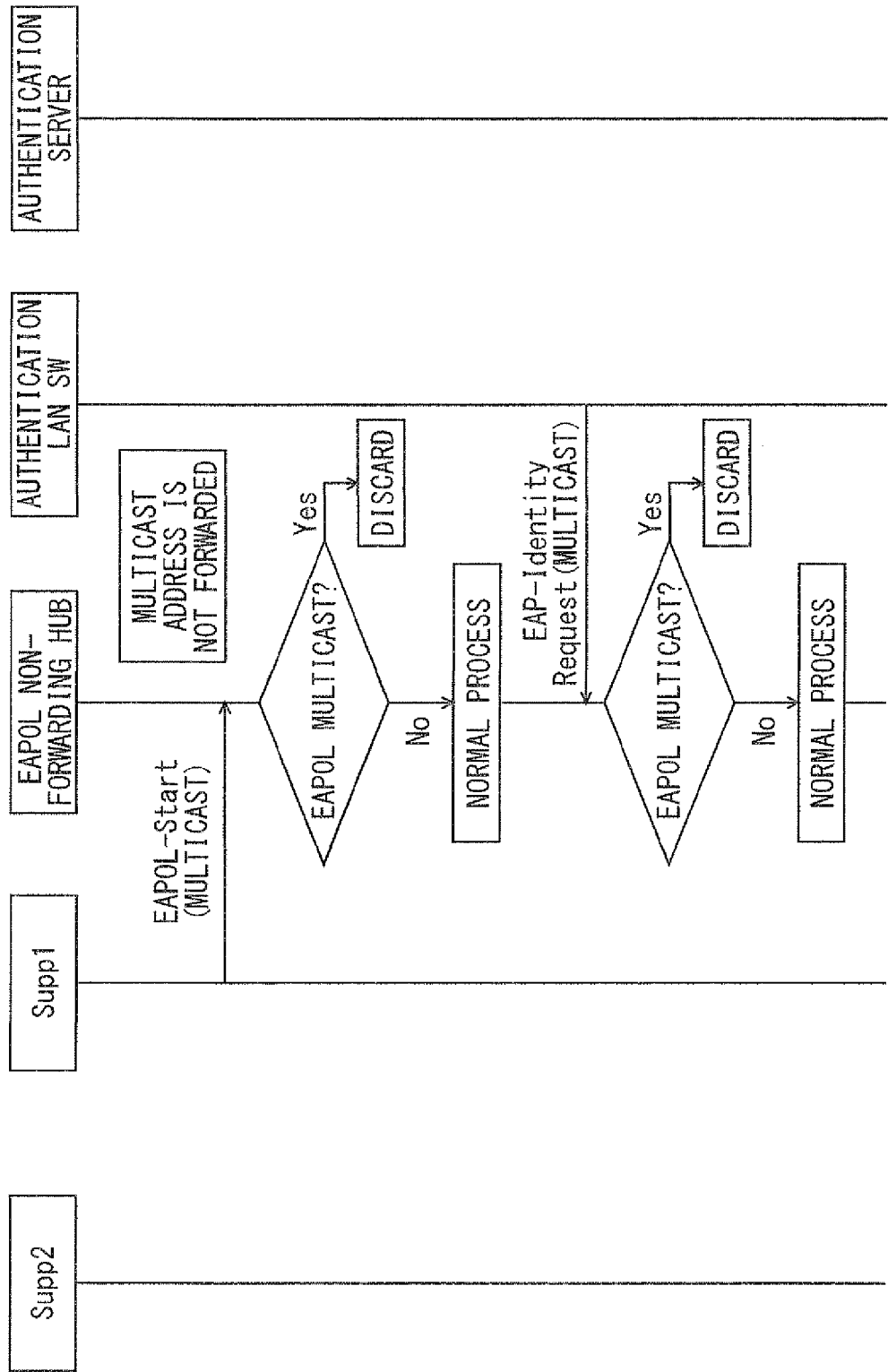
FIG. 25 is a diagram illustrating a sequence in the related art.
Figure 26:
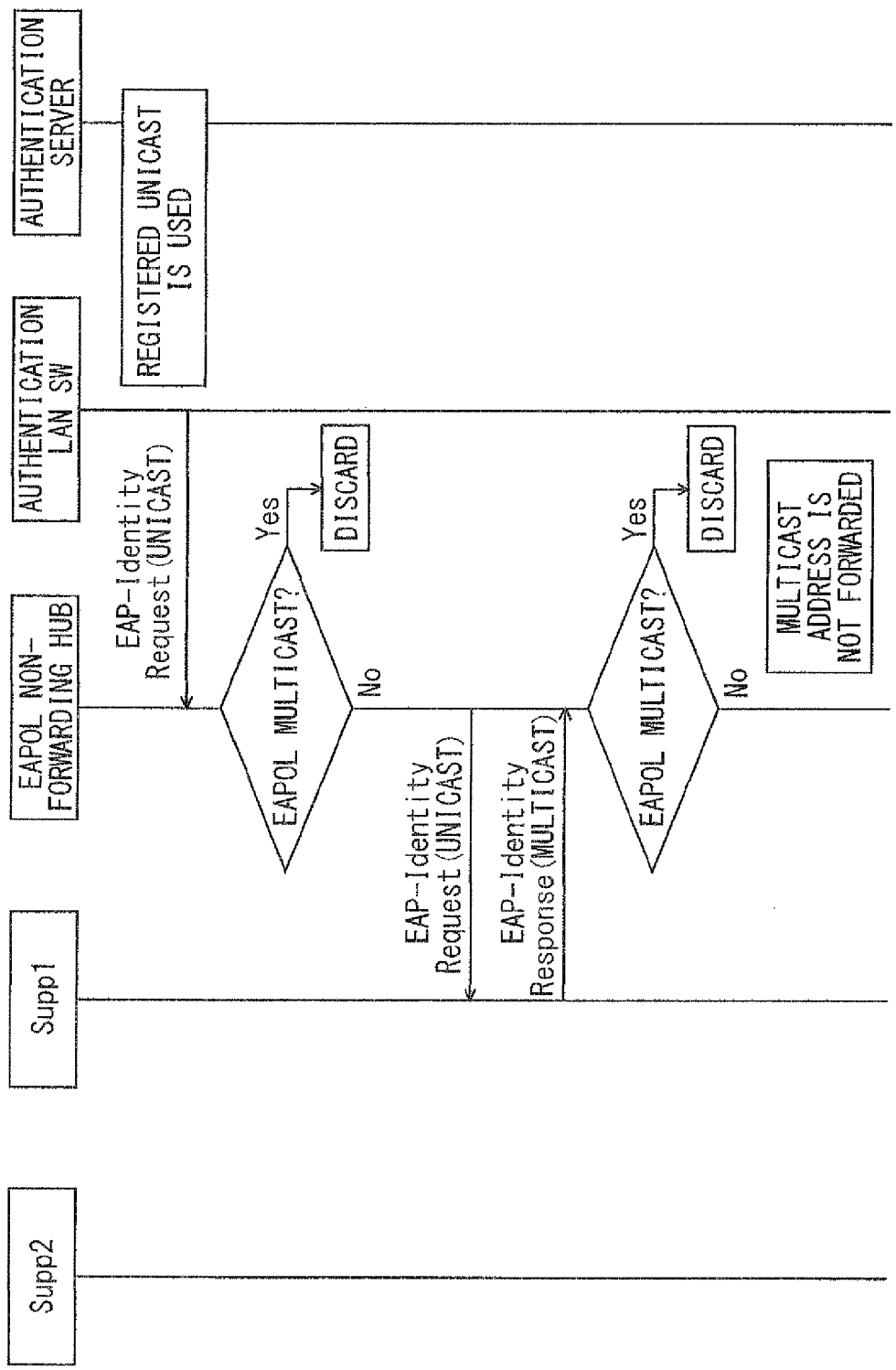
FIG. 26 is a diagram illustrating a sequence in the related art.
Figure 27:
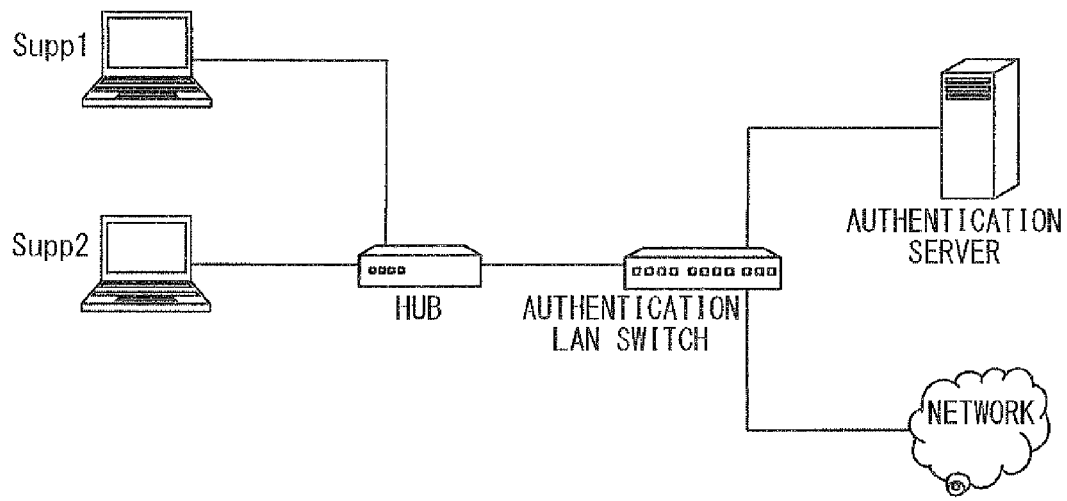
FIG. 27 is a diagram illustrating an overall configuration in the related art.
Figure 28:
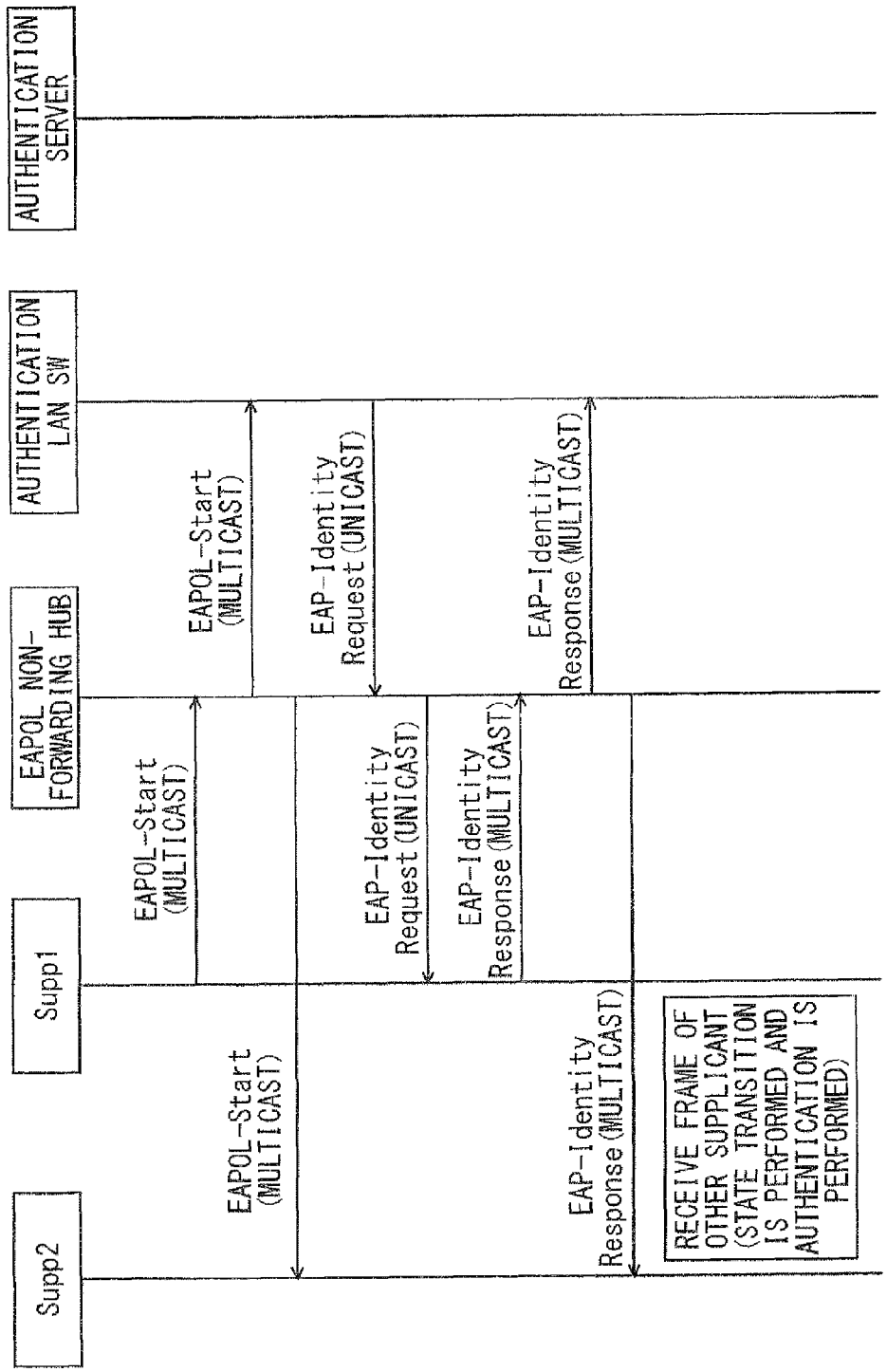
FIG. 28 is a diagram illustrating a sequence in the related art.

Next, the flow of the process in the communication apparatus will be described with reference to FIG. 24. In step S601, EAPOL-Start is transmitted to initiate the authentication process. The authentication process is performed by the supplicant authentication processing section. In step S602, measurement of time taken for authentication is started.

The time measurement is performed by the authentication elapsed time measuring section. In step S603, it is confirmed whether a predetermined time elapses. If the predetermined time elapses (Yes in S603), in step S605, it is confirmed whether the authentication process is completed. In step S606, in a case where the authentication, process is not completed, the authentication result is notified to the user as authentication failure. Then, whether to continue the authentication process according to the state transition of IEEE 802.1X is not limiting here. Hereinbefore, a case where the authentication result is the authentication failure has been described, but information about time-out may be notified.

As described above, in the above-mentioned eighth embodiment, the user can find out that the communication apparatus has not been authenticated for a long time. As a result, the user can realize that the network or the communication apparatus is in an abnormal state.

EAP (Extensible Authentication Protocol) described in the first to eighth embodiments may adopt a variety of methods. For example, EAP-MD5, EAP-TLS, PEAP or the like may be used.

The authentication method according to the invention can be applied to the usage of terminal authentication in a network in which a plurality of communication apparatuses is connected to one authentication LAN switch through a hub.

This application is based upon and claims the benefit of priority of Japanese Patent Application No. 2011-101095 filed on Apr. 28, 2011, the contents of which are incorporated herein by reference in its entirety.

What is claimed is:

1. A communication apparatus for transmitting an authentication frame to an authentication apparatus and receiving a response frame for response to the authentication frame from the authentication apparatus so that an authentication process is performed for the communication apparatus by the authentication apparatus, the communication apparatus comprising:
at least one processor and memory;
a transmission destination address changing section which changes a transmission destination address of the authentication frame;
a reception determining section which determines whether the response frame is received from the authentication apparatus; and
a transmitting section which transmits the authentication frame to the authentication apparatus, wherein
the transmitting section transmits the authentication frame to the authentication apparatus using a multicast address as the transmission destination address, and
if the reception determining section determines that the response frame is not received from the authentication apparatus, the transmission destination address changing section changes the transmission destination address from the multicast address to a broadcast address, and the transmitting section transmits the authentication frame that has the transmission destination address changed to the broadcast address to the authentication apparatus.

2. The communication apparatus according to claim 1, wherein
when the response frame is received from the authentication apparatus, the transmitting section transmits an authentication frame for response to the response frame to the authentication apparatus in a unicast address using the transmission destination address of the received response frame.

3. The communication apparatus according to claim 2, further comprising:
an authentication process stopping section which stops the authentication process, wherein
when the response frame is received from the authentication apparatus, the authentication process stopping section stops the authentication process, and the transmission destination address changing section transmits the authentication frame for response to the response frame to the authentication apparatus in the unicast address using the transmission destination address of the received response frame.

4. The communication apparatus according to claim 1, wherein
when a predetermined time elapses from a time when the authentication frame is transmitted, the reception determining section determines that the response frame is not received.

5. The communication apparatus according to claim 1, further comprising:
an output section which gives a notification to a user when the response frame is received from the authentication apparatus.

6. The communication apparatus according to claim 1, wherein
the authentication process is performed for the communication apparatus by the authentication apparatus according to a stipulation of IEEE 802.1X.

7. An authentication apparatus for transmitting an authentication frame to a communication apparatus and receiving a response frame for response to the authentication frame from the communication apparatus, thereby performing an authentication process for the communication apparatus, the authentication apparatus comprising:
at least one processor and memory;
a transmission destination address changing section which changes a transmission destination, address of the authentication frame;
a reception determining section which determines whether the response frame is received from the communication apparatus; and
a transmitting section which transmits the authentication frame to the communication apparatus, wherein
the transmitting section transmits the authentication frame to the communication apparatus using a multicast address as the transmission destination address, and
if the reception determining section determines that the response frame is not received from the communication apparatus, the transmission destination address changing section changes the transmission destination address from the multicast address to a broadcast address, and
the transmitting section transmits the authentication frame that has the transmission destination address changed to the broadcast address to the communication apparatus.

8. The authentication apparatus according to claim 7, wherein
when the response frame is received from the communication apparatus, the transmitting section transmits an authentication frame for response to the response frame to the communication apparatus in a unicast address using the transmission destination address of the received response frame.

9. A communication method of transmitting an authentication frame to an authentication apparatus and receiving a response frame for response to the authentication frame from the authentication apparatus so that an authentication process is performed by the authentication apparatus, the method comprising:
changing a transmission destination address of the authentication frame;
determining whether the response frame is received from the authentication apparatus; and
transmitting the authentication frame to the authentication apparatus, wherein
the authentication frame is transmitted to the authentication apparatus using a multicast address as the transmission destination address, and
if it is determined that the response frame is not received from the authentication apparatus, the transmission destination address is changed from the multicast address to a broadcast address, and the authentication frame that has the transmission destination address changed to the broadcast address is transmitted to the authentication apparatus, wherein the changing, the determining and the transmitting are performed by a configured communication apparatus including at least one processor and memory.

10. An authentication method of transmitting an authentication frame to a communication apparatus and receiving a response frame for response to the authentication frame from the communication apparatus to perform an authentication process for the communication apparatus, the method comprising:
changing a transmission destination address of the authentication frame;
determining whether the response frame is received from the communication apparatus; and
transmitting the authentication frame to the communication apparatus, wherein
the authentication frame is transmitted to the communication apparatus using a multicast address as the transmission destination address, and
if it is determined that the response frame is not received from the communication apparatus, the transmission destination address is changed from the multicast address to a broadcast address, and the authentication frame that has the transmission destination address changed to the broadcast address is transmitted to the communication apparatus, wherein the changing, the determining and the transmitting are performed by a configured authentication apparatus including at least one processor and memory.

* * * * *